US012628098B2

(12) United States Patent
Huang et al.

(10) Patent No.: US 12,628,098 B2
(45) Date of Patent: May 12, 2026

(54) TECHNIQUES FOR COMMUNICATING SYNCHRONIZATION SIGNALS

(71) Applicant: QUALCOMM Incorporated, San Diego, CA (US)

(72) Inventors: Yi Huang, San Diego, CA (US); Hung Dinh Ly, San Diego, CA (US); Peter Gaal, San Diego, CA (US); Jing Jiang, San Diego, CA (US); Yu Zhang, San Diego, CA (US); Lei Xiao, San Jose, CA (US); Yongle Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 876 days.

(21) Appl. No.: 17/951,039

(22) Filed: Sep. 22, 2022

(65) Prior Publication Data

US 2024/0107467 A1    Mar. 28, 2024

(51) Int. Cl.
*H04W 56/00*      (2009.01)
*H04W 16/28*      (2009.01)
*H04W 74/0833*    (2024.01)

(52) U.S. Cl.
CPC ......... *H04W 56/001* (2013.01); *H04W 16/28* (2013.01); *H04W 74/0841* (2013.01)

(58) Field of Classification Search
CPC ............... H04W 56/001; H04W 16/28; H04W 74/0841
See application file for complete search history.

(56) References Cited

U.S. PATENT DOCUMENTS

| | | | | |
|---|---|---|---|---|
| 2015/0326290 | A1* | 11/2015 | Harrison | H04B 7/0639 |
| | | | | 375/260 |
| 2019/0261329 | A1* | 8/2019 | Park | H04L 5/0048 |
| 2021/0144742 | A1* | 5/2021 | Jeon | H04W 74/0833 |

FOREIGN PATENT DOCUMENTS

| | | | | | |
|---|---|---|---|---|---|
| WO | WO-2019076169 | A1 * | 4/2019 | | H04W 72/23 |

* cited by examiner

*Primary Examiner* — Samina F Choudhry
(74) *Attorney, Agent, or Firm* — Holland & Hart LLP

(57)                ABSTRACT

Methods, systems, and devices for wireless communications are described. A network entity may transmit a set of spatially multiplexed synchronization signals in a same symbol period. The set of spatially multiplexed synchronization signals may indicate a parameter, such as a cell identifier, for the network entity. The network entity may select a sequence for each synchronization signal of the set. A user equipment (UE) may monitor for the set of spatially multiplexed synchronization signals during the same symbol period. The UE may differentiate each synchronization signal based on a respective sequence used to transmit each synchronization signal. The UE may determine that the set of spatially multiplexed synchronization signals were transmitted by the network entity using multiple antenna ports. The UE may determine the parameter for the network entity based on receiving the set of spatially multiplexed synchronization signals.

25 Claims, 19 Drawing Sheets

315

Antenna
Port
305-a

Antenna
Port
305-b 320-a  320-b  320-c

Primary Synchronization Signal 310

300

Secondary Synchronization Signal 410

400

☒ Primary Synchronization Signal 310

▨ Secondary Synchronization Signal 410

500

| | Primary Synchronization Signal <u>310</u> |
| --- | --- |
| | Secondary Synchronization Signal <u>410</u> |

600

810

820

815

805

800

1210

1220

1215

1205

1200

130

105

115

Network
Entity

Transceiver

1510

Antenna

1515

Communications
Manager

1520

Memory

Code

1530

1525

1540

Processor

1535

1505

1500

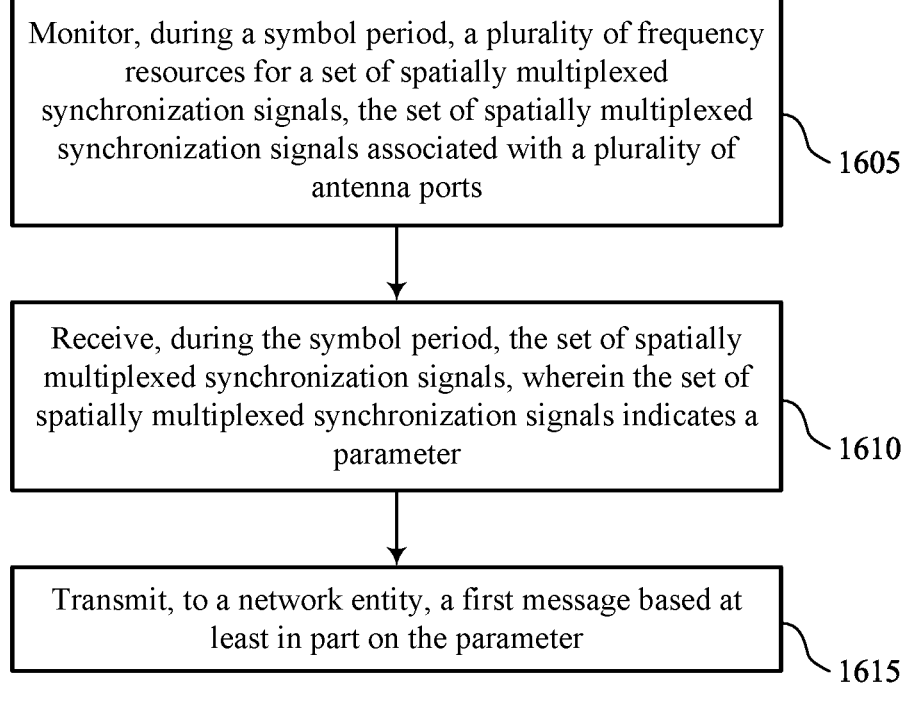

Monitor, during a symbol period, a plurality of frequency resources for a set of spatially multiplexed synchronization signals, the set of spatially multiplexed synchronization signals associated with a plurality of antenna ports

1605

Receive, during the symbol period, the set of spatially multiplexed synchronization signals, wherein the set of spatially multiplexed synchronization signals indicates a parameter

1610

Transmit, to a network entity, a first message based at least in part on the parameter

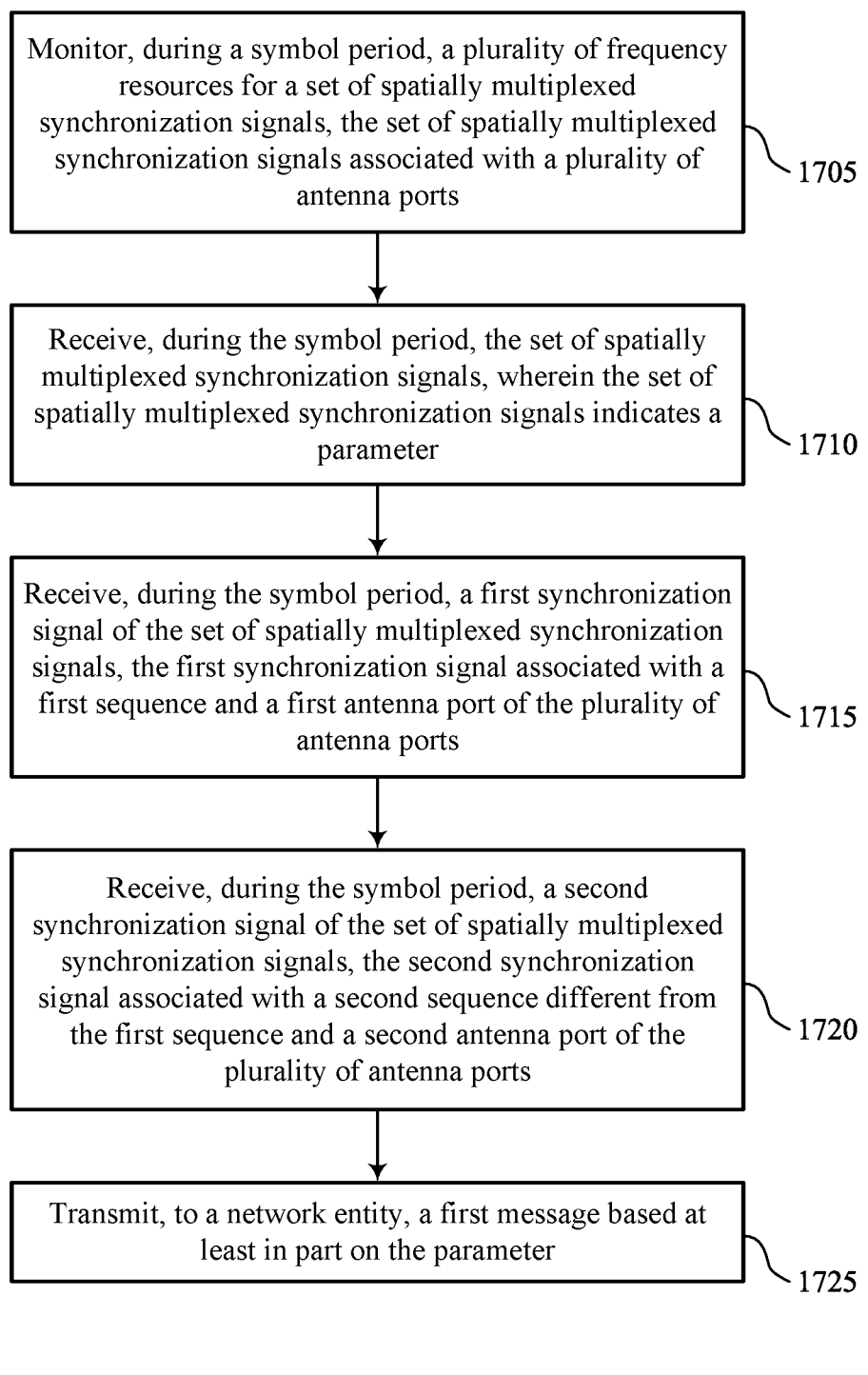

Monitor, during a symbol period, a plurality of frequency resources for a set of spatially multiplexed synchronization signals, the set of spatially multiplexed synchronization signals associated with a plurality of antenna ports ⟍ 1705

Receive, during the symbol period, the set of spatially multiplexed synchronization signals, wherein the set of spatially multiplexed synchronization signals indicates a parameter ⟍ 1710

Receive, during the symbol period, a first synchronization signal of the set of spatially multiplexed synchronization signals, the first synchronization signal associated with a first sequence and a first antenna port of the plurality of antenna ports ⟍ 1715

Receive, during the symbol period, a second synchronization signal of the set of spatially multiplexed synchronization signals, the second synchronization signal associated with a second sequence different from the first sequence and a second antenna port of the plurality of antenna ports ⟍ 1720

Transmit, to a network entity, a first message based at least in part on the parameter ⟍ 1725

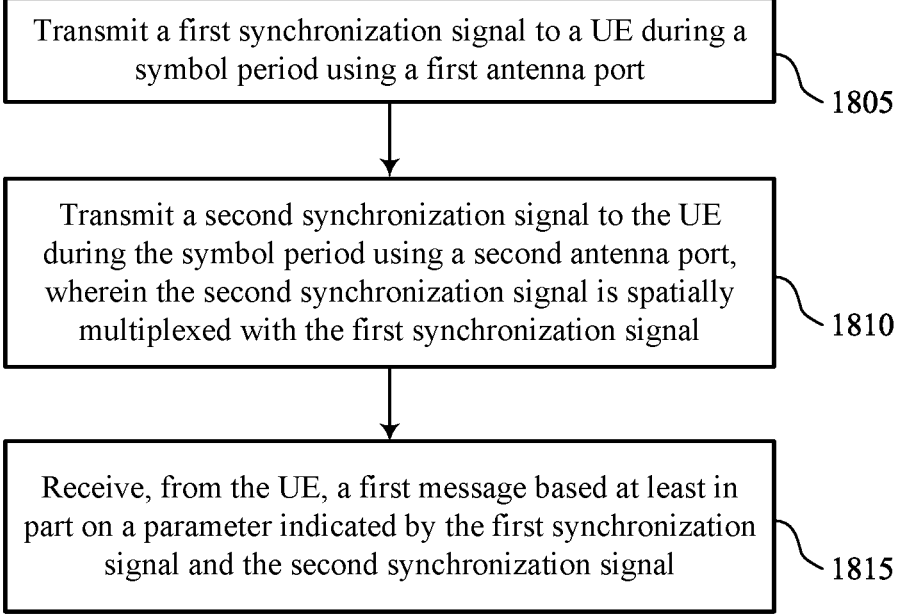

Transmit a first synchronization signal to a UE during a symbol period using a first antenna port

1805

Transmit a second synchronization signal to the UE during the symbol period using a second antenna port, wherein the second synchronization signal is spatially multiplexed with the first synchronization signal

1810

Receive, from the UE, a first message based at least in part on a parameter indicated by the first synchronization signal and the second synchronization signal

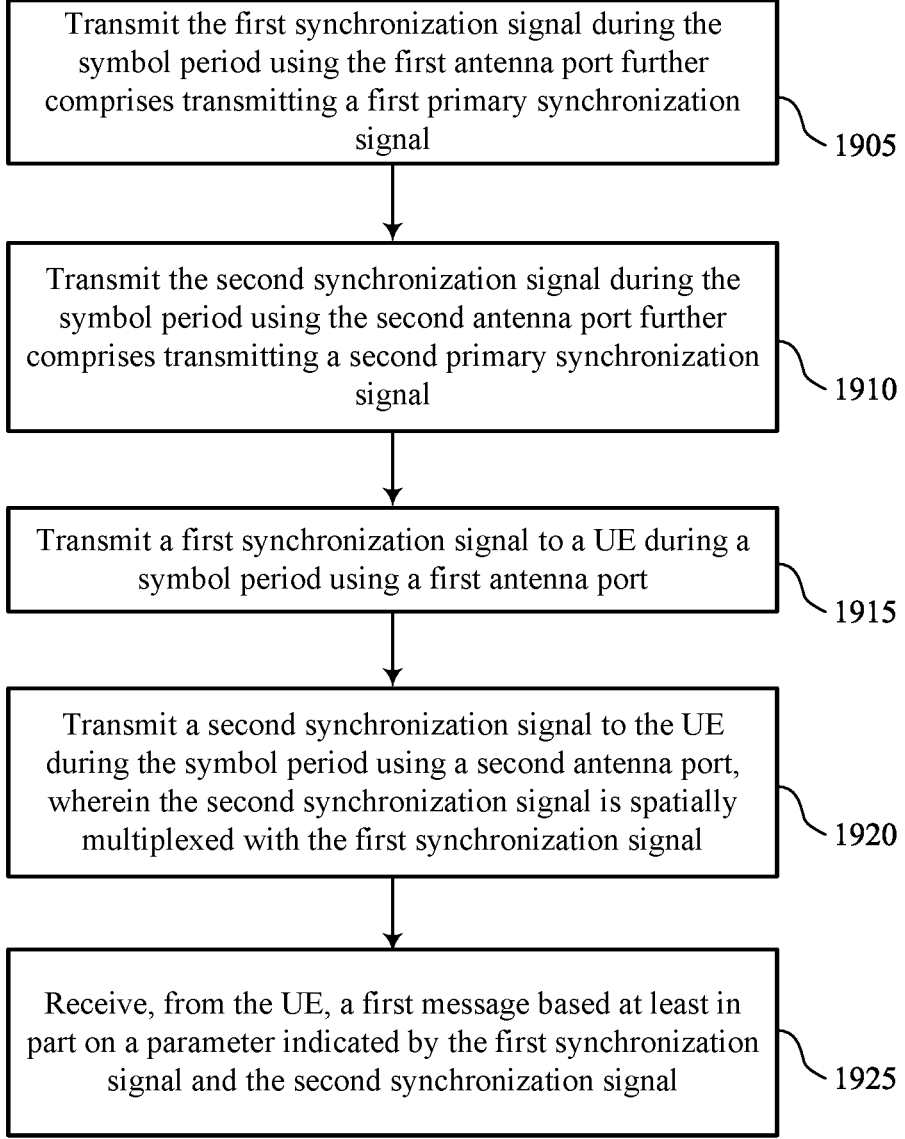

Transmit the first synchronization signal during the symbol period using the first antenna port further comprises transmitting a first primary synchronization signal ⌐ 1905

Transmit the second synchronization signal during the symbol period using the second antenna port further comprises transmitting a second primary synchronization signal ⌐ 1910

Transmit a first synchronization signal to a UE during a symbol period using a first antenna port ⌐ 1915

Transmit a second synchronization signal to the UE during the symbol period using a second antenna port, wherein the second synchronization signal is spatially multiplexed with the first synchronization signal ⌐ 1920

Receive, from the UE, a first message based at least in part on a parameter indicated by the first synchronization signal and the second synchronization signal ⌐ 1925

TECHNIQUES FOR COMMUNICATING SYNCHRONIZATION SIGNALS

FIELD OF TECHNOLOGY

The following relates to wireless communications, including techniques for communicating synchronization signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support network devices equipped with multiple antenna ports (e.g., antenna arrays, antenna panels). For example, a network entity may include multiple antenna ports which may utilized for communicating multiple streams of information. In some cases, network devices may perform spatial multiplexing, which may include concurrently communicating information (e.g., different information) via multiple antenna ports. Additionally, or alternatively, some wireless communication systems may support synchronization signaling between network devices. For example, a network entity may periodically transmit one or more synchronization signals for synchronizing time-frequency resources with UEs. In some cases, network devices may communicate synchronization signaling according to one or more protocols for communications, which may specify communication techniques and time-frequency resource utilization patterns (e.g., frame structures) for synchronization signals.

SUMMARY

The described techniques relate to improved methods, systems, devices, and apparatuses that support techniques for communicating synchronization signals. For example, the described techniques provide for a network entity to transmit a set of spatially multiplexed synchronization signals during a symbol period. The set of spatially multiplexed synchronization signals may include any combination of one or more primary synchronization signals, one or more secondary synchronization signals, or both. The set of spatially multiplexed synchronization signals may be transmitted using two or more antenna ports (e.g., of the network entity). In some cases, the set of spatially multiplexed synchronization signals may be received by a user equipment (UE) using two or more antenna ports (e.g., of the UE). The UE may monitor for the set of spatially multiplexed synchronization signals during the symbol period. In some cases, the set of spatially multiplexed synchronization signals may indicate a parameter (e.g., one or more values used to determine a cell identifier). Additionally, or alternatively, the UE and the network entity may communicate signaling based on the set of spatially multiplexed synchronization signals (e.g., based on the parameter). For example, the UE and the network entity may select one or more beams based on the set of synchronization signals.

A method for wireless communication at a user equipment (UE) is described. The method may include monitoring, during a symbol period, a set of multiple frequency resources for a set of spatially multiplexed synchronization signals, the set of spatially multiplexed synchronization signals associated with a set of multiple antenna ports, receiving, during the symbol period, the set of spatially multiplexed synchronization signals, where the set of spatially multiplexed synchronization signals indicates a parameter, and transmitting, to a network entity, a first message based on the parameter.

An apparatus for wireless communication at a UE is described. The apparatus may include a processor, memory coupled with the processor, and instructions stored in the memory. The instructions may be executable by the processor to cause the apparatus to monitor, during a symbol period, a set of multiple frequency resources for a set of spatially multiplexed synchronization signals, the set of spatially multiplexed synchronization signals associated with a set of multiple antenna ports, receive, during the symbol period, the set of spatially multiplexed synchronization signals, where the set of spatially multiplexed synchronization signals indicates a parameter, and transmit, to a network entity, a first message based on the parameter.

Another apparatus for wireless communication at a UE is described. The apparatus may include means for monitoring, during a symbol period, a set of multiple frequency resources for a set of spatially multiplexed synchronization signals, the set of spatially multiplexed synchronization signals associated with a set of multiple antenna ports, means for receiving, during the symbol period, the set of spatially multiplexed synchronization signals, where the set of spatially multiplexed synchronization signals indicates a parameter, and means for transmitting, to a network entity, a first message based on the parameter.

A non-transitory computer-readable medium storing code for wireless communication at a UE is described. The code may include instructions executable by a processor to monitor, during a symbol period, a set of multiple frequency resources for a set of spatially multiplexed synchronization signals, the set of spatially multiplexed synchronization signals associated with a set of multiple antenna ports, receive, during the symbol period, the set of spatially multiplexed synchronization signals, where the set of spatially multiplexed synchronization signals indicates a parameter, and transmit, to a network entity, a first message based on the parameter.

In some examples of the method, apparatuses, and non-transitory computer-readable medium described herein, receiving the set of spatially multiplexed synchronization signals may include operations, features, means, or instructions for receiving, during the symbol period, a first synchronization signal of the set of spatially multiplexed synchronization signals, the first synchronization signal associated with a first sequence and a first antenna port of the set of multiple antenna ports and receiving, during the symbol period, a second synchronization signal of the set of spatially multiplexed synchronization signals, the second synchronization signal associated with a second sequence different from the first sequence and a second antenna port of the set of multiple antenna ports.

In some examples of the method, apparatuses, and non-transitory computer-readable medium described herein, receiving the set of spatially multiplexed synchronization signals may include operations, features, means, or instructions for receiving, during the symbol period, a first synchronization signal spatially multiplexed with a second synchronization signal, the first synchronization signal including a first primary synchronization signal associated with a first antenna port of the set of multiple antenna ports and the second synchronization signal including a second primary synchronization signal associated with a second antenna port of the set of multiple antenna ports.

In some examples of the method, apparatuses, and non-transitory computer-readable medium described herein, receiving the set of spatially multiplexed synchronization signals may include operations, features, means, or instructions for receiving, during the symbol period, a first synchronization signal spatially multiplexed with a second synchronization signal, the first synchronization signal including a first secondary synchronization signal associated with a first antenna port of the set of multiple antenna ports and the second synchronization signal including a second secondary synchronization signal associated with a second antenna port of the set of multiple antenna ports.

In some examples of the method, apparatuses, and non-transitory computer-readable medium described herein, receiving the set of spatially multiplexed synchronization signals may include operations, features, means, or instructions for receiving, during the symbol period, a first synchronization signal spatially multiplexed with a second synchronization signal, the first synchronization signal including a primary synchronization signal associated with a first antenna port of the set of multiple antenna ports and the second synchronization signal including a secondary synchronization signal associated with a second antenna port of the set of multiple antenna ports.

In some examples of the method, apparatuses, and non-transitory computer-readable medium described herein, receiving the set of spatially multiplexed synchronization signals may include operations, features, means, or instructions for receiving, during the symbol period, a first primary synchronization signal associated with a first antenna port of the set of multiple antenna ports, a second primary synchronization signal associated with a second antenna port of the set of multiple antenna ports, a first secondary synchronization signal associated with a third antenna port of the set of multiple antenna ports, and a second secondary synchronization signal associated with a fourth antenna port of the set of multiple antenna ports.

Some examples of the method, apparatuses, and non-transitory computer-readable medium described herein may further include operations, features, means, or instructions for measuring a first synchronization signal of the set of spatially multiplexed synchronization signals via first antenna port of the set of multiple antenna ports and a second synchronization signal of the set of spatially multiplexed synchronization signals via a second antenna port of the set of multiple antenna ports.

Some examples of the method, apparatuses, and non-transitory computer-readable medium described herein may further include operations, features, means, or instructions for selecting a first beam from a set of multiple beams based on measuring the first synchronization signal via the first antenna port and measuring the second synchronization signal via the second antenna port and transmitting, to the network entity, a random access message using a first random access occasion of a set of multiple different random access occasions, the first random access occasion associated with the first beam.

In some examples of the method, apparatuses, and non-transitory computer-readable medium described herein, each antenna port may be associated with one or more antennas.

In some examples of the method, apparatuses, and non-transitory computer-readable medium described herein, the symbol period includes an orthogonal frequency-division multiplexing symbol period.

In some examples of the method, apparatuses, and non-transitory computer-readable medium described herein, the parameter includes a cell identifier for the network entity.

A method for wireless communication at a network entity is described. The method may include transmitting a first synchronization signal to a UE during a symbol period using a first antenna port, transmitting a second synchronization signal to the UE during the symbol period using a second antenna port, where the second synchronization signal is spatially multiplexed with the first synchronization signal, and receiving, from the UE, a first message based on a parameter indicated by the first synchronization signal and the second synchronization signal.

An apparatus for wireless communication at a network entity is described. The apparatus may include a processor, memory coupled with the processor, and instructions stored in the memory. The instructions may be executable by the processor to cause the apparatus to transmit a first synchronization signal to a UE during a symbol period using a first antenna port, transmit a second synchronization signal to the UE during the symbol period using a second antenna port, where the second synchronization signal is spatially multiplexed with the first synchronization signal, and receive, from the UE, a first message based on a parameter indicated by the first synchronization signal and the second synchronization signal.

Another apparatus for wireless communication at a network entity is described. The apparatus may include means for transmitting a first synchronization signal to a UE during a symbol period using a first antenna port, means for transmitting a second synchronization signal to the UE during the symbol period using a second antenna port, where the second synchronization signal is spatially multiplexed with the first synchronization signal, and means for receiving, from the UE, a first message based on a parameter indicated by the first synchronization signal and the second synchronization signal.

A non-transitory computer-readable medium storing code for wireless communication at a network entity is described. The code may include instructions executable by a processor to transmit a first synchronization signal to a UE during a symbol period using a first antenna port, transmit a second synchronization signal to the UE during the symbol period using a second antenna port, where the second synchronization signal is spatially multiplexed with the first synchronization signal, and receive, from the UE, a first message based on a parameter indicated by the first synchronization signal and the second synchronization signal.

Some examples of the method, apparatuses, and non-transitory computer-readable medium described herein may further include operations, features, means, or instructions for transmitting the first synchronization signal during the symbol period using the first antenna port further includes transmitting the first synchronization signal using a first sequence and transmitting the second synchronization signal during the symbol period using the second antenna port further includes transmitting the second synchronization signal using a second sequence.

Some examples of the method, apparatuses, and non-transitory computer-readable medium described herein may further include operations, features, means, or instructions for transmitting the first synchronization signal during the symbol period using the first antenna port further includes transmitting a first primary synchronization signal and transmitting the second synchronization signal during the symbol period using the second antenna port further includes transmitting a second primary synchronization signal.

Some examples of the method, apparatuses, and non-transitory computer-readable medium described herein may further include operations, features, means, or instructions for transmitting the first synchronization signal during the symbol period using the first antenna port further includes transmitting a first secondary synchronization signal and transmitting the second synchronization signal during the symbol period using the second antenna port further includes transmitting a second secondary synchronization signal.

Some examples of the method, apparatuses, and non-transitory computer-readable medium described herein may further include operations, features, means, or instructions for transmitting the first synchronization signal during the symbol period using the first antenna port further includes transmitting a primary synchronization signal and transmitting the second synchronization signal during the symbol period using the second antenna port further includes transmitting a secondary synchronization signal.

Some examples of the method, apparatuses, and non-transitory computer-readable medium described herein may further include operations, features, means, or instructions for transmitting a third synchronization signal to the UE during the symbol period using a third antenna port and transmitting a fourth synchronization signal to the UE during the symbol period using a fourth antenna port.

In some examples of the method, apparatuses, and non-transitory computer-readable medium described herein, the first synchronization signal may be a first primary synchronization signal, the second synchronization signal may be a second primary synchronization signal, the third synchronization signal may be a first secondary synchronization signal, and the fourth synchronization signal may be a second secondary synchronization signal and the first synchronization signal, the second synchronization signal, the third synchronization signal, and the fourth synchronization signal may be spatially multiplexed.

Some examples of the method, apparatuses, and non-transitory computer-readable medium described herein may further include operations, features, means, or instructions for receiving, from the UE, a random access message using a first random access occasion of a set of multiple different random access occasions, the first random access occasion associated with a first beam.

Some examples of the method, apparatuses, and non-transitory computer-readable medium described herein may further include operations, features, means, or instructions for selecting the first beam for subsequent communications with the UE based on receiving, from the UE, the random access message using the first random access occasion.

In some examples of the method, apparatuses, and non-transitory computer-readable medium described herein, each antenna port may be associated with one or more antennas.

In some examples of the method, apparatuses, and non-transitory computer-readable medium described herein, the symbol period includes an orthogonal frequency-division multiplexing symbol period.

In some examples of the method, apparatuses, and non-transitory computer-readable medium described herein, the parameter includes a cell identifier for the network entity.

BRIEF DESCRIPTION OF THE DRAWINGS

FIGS. 16 through 19 show flowcharts illustrating methods that support techniques for communicating synchronization signals in accordance with one or more aspects of the present disclosure.

DETAILED DESCRIPTION

Some wireless communications systems may support signaling using multiple antenna ports (e.g., antenna arrays, antenna panels). For example, a network entity may transmit information to a user equipment (UE) using multiple antenna ports. In some cases, network devices equipped with multiple antenna ports may spatially multiplex communications, which may increase throughput. In some cases, spatial multiplexing may include concurrently communicating different signals (e.g., different information) that are separated in space (e.g., using different antenna ports that are separated by a distance). However, some network devices (e.g., some UEs) may not be configured to effectively differentiate (e.g., decode) spatially multiplexed signals, which may limit throughput or present other communication challenges. For example, some network entities and some UEs may be equipped with multiple antennas, but may not be configured to transmit or receive spatially multiplexed synchronization signals, which may reduce throughput associated with synchronization signaling.

In accordance with aspects of the present disclosure, a network entity may transmit (e.g., simultaneously, during a same symbol) a set of spatially multiplexed synchronization signals. Additionally, or alternatively, the network entity may select a sequence (e.g., an m-sequence) for each synchronization signal of the set of spatially multiplexed synchronization signals. Accordingly, a UE may monitor for the set of spatially multiplexed synchronization signals during the same symbol. In some cases, the UE may differentiate each synchronization signal based on a respective sequence used to transmit each synchronization signal. For example, the UE may be configured to identify that the set of spatially multiplexed synchronization signals were transmitted by the network entity using multiple antenna ports. Additionally, or alternatively, the UE may determine a parameter (e.g., a cell identifier for the network entity, a timing parameter, a frequency-tracking parameter) based on receiving the set of spatially multiplexed synchronization signals.

Aspects of the disclosure are initially described in the context of wireless communications systems. Aspects of the disclosure are further illustrated by and described with reference to communication configurations, process flows, apparatus diagrams, system diagrams, and flowcharts that relate to techniques for communicating synchronization signals.

Figure 1:
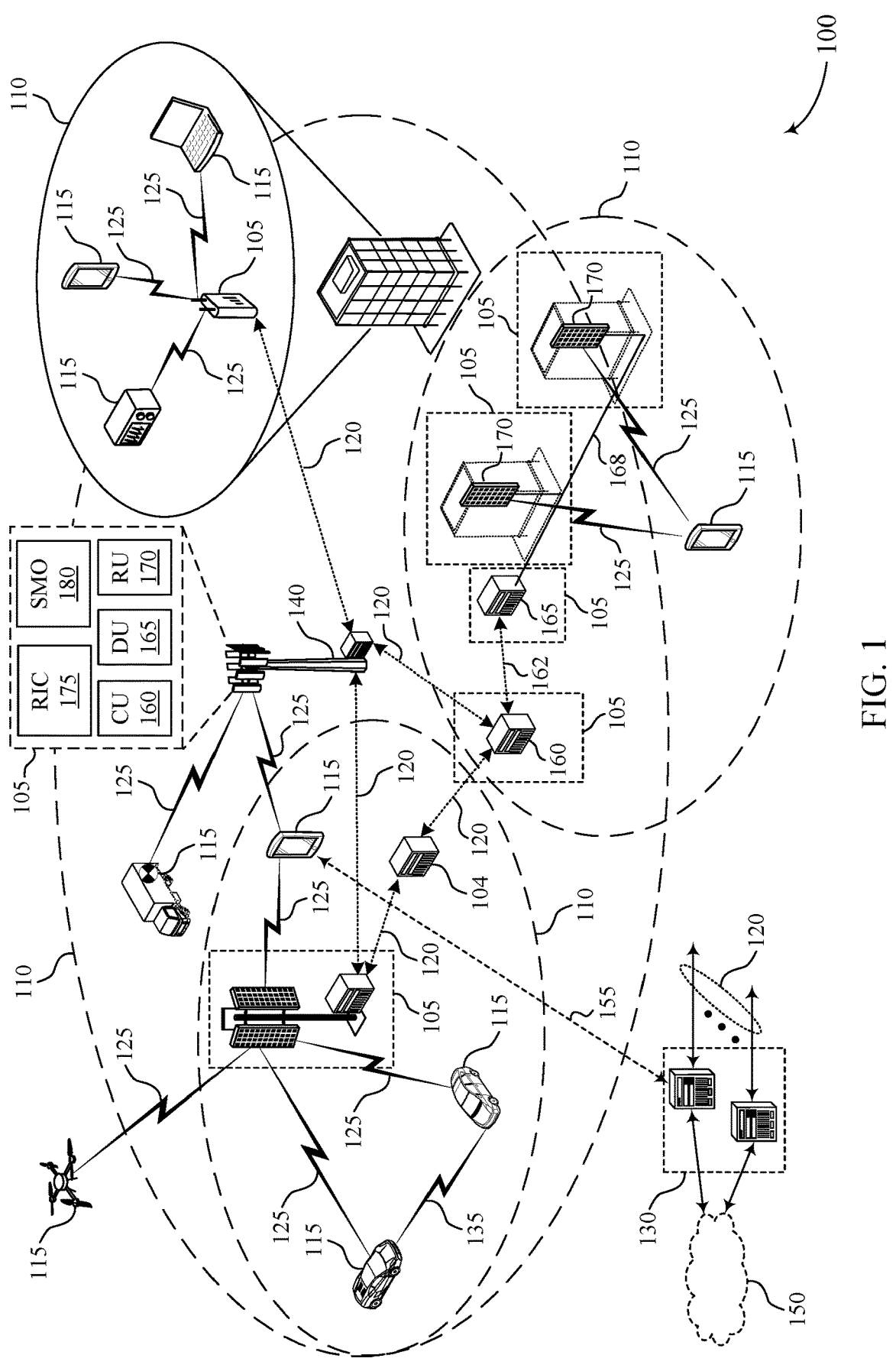
FIG. 1 illustrates an example of a wireless communications system that supports techniques for communicating synchronization signals in accordance with one or more aspects of the present disclosure.

FIG. 1 illustrates an example of a wireless communications system 100 that supports techniques for communicating synchronization signals in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for communicating synchronization signals as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels (e.g., antenna ports), which may support MIMO operations or transmit or receive beamforming. For example, one or more base station antennas or antenna arrays (e.g., antenna ports) may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support signaling using multiple antenna ports. For example, a network entity 105 may transmit information to a UE 115 using multiple antenna ports. In some cases (e.g., to increase throughput), a network entity 105 may use multiple antenna ports to transmit different signals (e.g., different information) to a UE 115 (e.g., simultaneously). In some other cases (e.g., to increase spatial diversity), a network entity 105-a may use multiple antenna ports to transmit duplications of a same signal (e.g., same information) to a UE 115 (e.g., simultaneously). Additionally, or alternatively, a network device (e.g., a UE 115, a network entity 105, or any other network device) may utilize spatial multiplexing to transmit different signals simultaneously (e.g., via multiple antenna ports) such that each signal may be differentiated by a receiving device. However, some network devices (e.g., some UEs 115) may not be configured to effectively differentiate (e.g., decode) spatially multiplexed signals, which may limit throughput or present other communication challenges. For example, some network entities 105 and some UEs 115 may be equipped with multiple antennas, but may not be configured to transmit or receive spatially multiplexed synchronization signals, which may reduce throughput associated with synchronization signaling.

In accordance with aspects of the present disclosure, a network entity 105 may transmit (e.g., simultaneously, during a same symbol) a set of spatially multiplexed synchronization signals. Additionally, or alternatively, the network entity 105 may select a sequence (e.g., an m-sequence) for each synchronization signal of the set of spatially multiplexed synchronization signals. Accordingly, a UE 115 may monitor for the set of spatially multiplexed synchronization signals during the same symbol. In some cases, the UE 115 may differentiate each synchronization signal based on a respective sequence used to transmit each synchronization signal. For example, the UE 115 may be configured to identify that the set of spatially multiplexed synchronization signals were transmitted by the network entity 105 using multiple antenna ports. Additionally, or alternatively, the UE 115 may determine a parameter (e.g., a cell identifier for the network entity, a timing parameter, a frequency-tracking parameter) based on receiving the set of spatially multiplexed synchronization signals.

Figure 2:
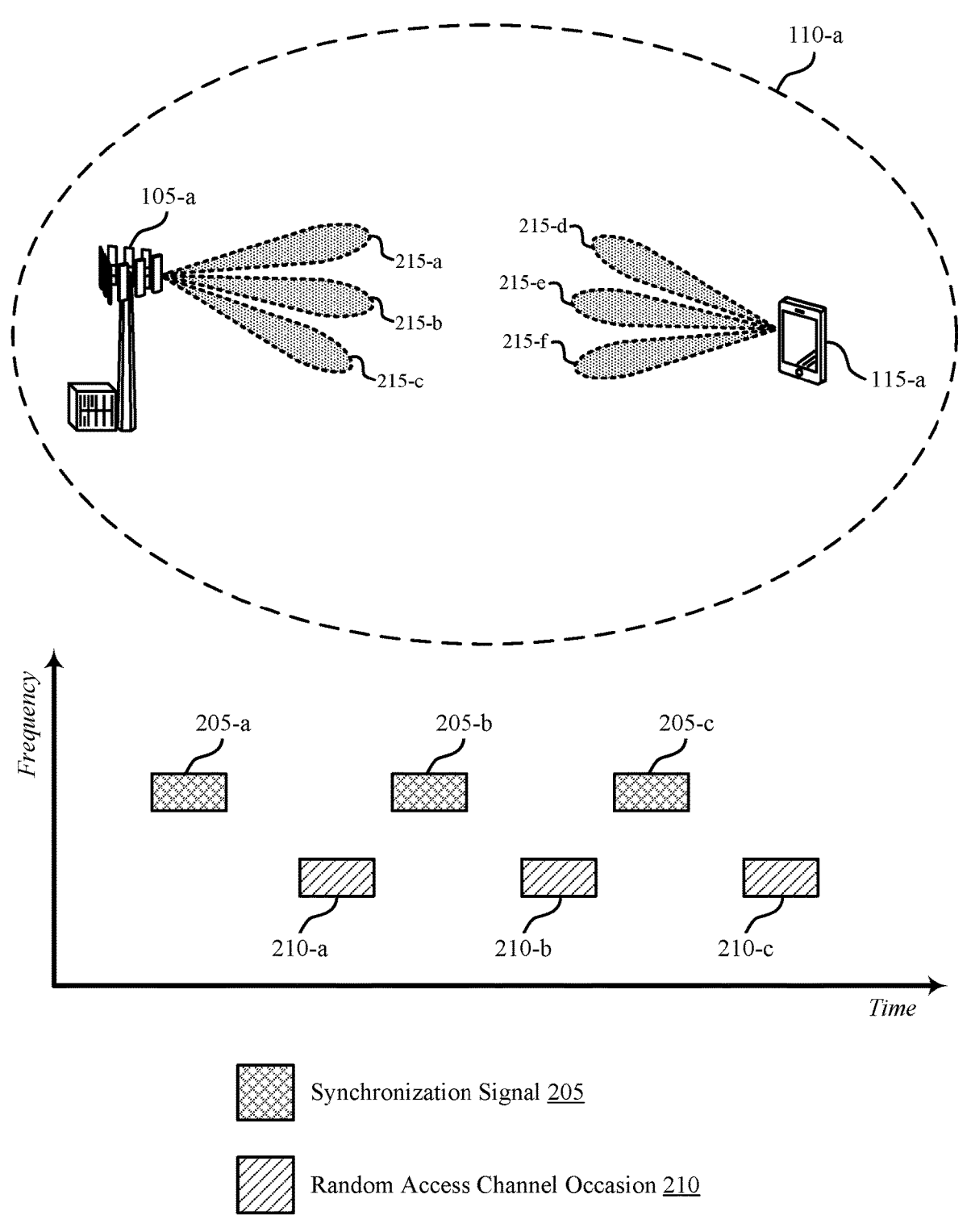
FIG. 2 illustrates an example of a wireless communications system that supports techniques for communicating synchronization signals in accordance with one or more aspects of the present disclosure.

FIG. 2 illustrates an example of a wireless communications system 200 that supports techniques for communicating synchronization signals in accordance with one or more aspects of the present disclosure. One or more aspects of the wireless communications system 200 may be implemented by the wireless communications system 100. For example, the wireless communications system 200 may include a network entity 105-a, a UE 115-a, and a coverage area 110-a, which may be examples of network entities 105, UEs 115, and coverage areas 110 as described with reference to FIG. 1. The wireless communications system 200 may also include one or more synchronization signals 205 and one or more random access channel occasions 210. In some cases, the network entity 105-a and the UE 115-a may communicate directionally using one or more beams 215. For example, the network entity 105-a may transmit one or more synchronization signals 205 to the UE 115-a using one or more beams 215.

The network entity 105-a may transmit one or more synchronization signals 205 to establish a connection with and synchronize communications (e.g., synchronize time-frequency resources) with the UE 115-a. In some cases, the network entity 105-a may transmit multiple synchronization signals 205 with a periodicity (e.g., using a constant time interval). Additionally, or alternatively, the network entity 105-a may transmit synchronization signals 205 continuously. In some cases, the UE 115-a may enter the coverage area 110-a and may monitor for synchronization signals 205 from the network entity 105-a. The UE 115-a may determine time-frequency resources to monitor for synchronization signals 205 based on a configuration for receiving synchronization signals 205. In some cases, a synchronization signal 205 may be an example of synchronization signal block (SSB), which may include one or more primary synchronization signals (PSSs) and one or more secondary synchronization signals (SSSs). Additionally, or alternatively, an SSB may include one or more physical broadcast channel (PBCH) payloads and one or more empty resource elements (REs). An SSB may be transmitted according to a resource configuration (e.g., a frame structure). In some cases, an SSB, or any other type of synchronization signal 205, may be communicated over a PBCH. For example, the network entity 105-a may transmit a synchronization signal 205 to the UE 115-a using a PBCH.

In some cases, a network entity 105-a may transmit one or more bursts of SSBs. An SSB burst may include multiple SSBs. In some cases, a transmission of an SSB within an SSB burst (e.g., an SSB burst set) may be confined to a 5 ms window (e.g., regardless of SSB burst set periodicity). A quantity (e.g., a maximum quantity) of candidate SSB locations (e.g., within the 5 ms window) may be based on a carrier frequency range. The quantity of candidate SSB locations may be represented by a variable (e.g., L). In some cases, a beam sweeping operation (e.g., for an SSB) may be based on the quantity of candidate SSB locations. For a carrier frequency range of up to 3 GHz, a quantity of candidate SSB locations may be 4 (e.g., L=4), for a carrier frequency range of 3 GHz to 6 GHz, a quantity of candidate SSB locations may be 8 (e.g., L=8), and for a carrier frequency range of 6 GHz to 52.6 GHz, a quantity of candidate SSB locations may be 64 (e.g., L=64).

The resource configuration may include any combination of time-frequency resources (e.g., REs, symbols) allocated to sub-components of a synchronization signal 205. For example, a resource configuration may include time-frequency resource allocations for SSSs, PSSs, PBCH payloads, and empty REs. In some cases, SSSs, PSSs, PBCH payloads, and empty REs may be time-division multiplexed (e.g., allocated to different time resources, allocated to different symbols). Additionally, or alternatively, SSSs, PSSs, PBCH payloads, and empty REs may be time-division multiplexed for single and multi-beam scenarios. An SSB may be based on a time domain mapping (e.g., an ordering of each subcomponent of the SSB with respect to time).

In some cases, SSSs, PSSs, PBCH payloads, and empty REs may be frequency-division multiplexed (e.g., allocated to different frequency resources within a same symbol). An SSB (e.g., a synchronization signal 205) may be used for downlink initial access and synchronization. As described herein, an SSB may include a PSS and an SSS. In some cases, a PSS may indicate one or 3 possible cell identifiers (IDs) and an SSS may indicate one of 336 possible cell IDs. In total, PSSs and SSSs (e.g., when combined) may indicate up to 1008 different cell IDs. For example, a PSS/SSS pair may be used to indicate one of the possible 1008 different cell IDs. In some cases, via PSS and SSS detection, the UE 115-*a* may camp on a cell and synchronize time-frequency resources.

In some cases, a subcarrier spacing for a resource configuration (e.g., for a synchronization signal 205) may be based on a frequency range used for transmitting the synchronization signal 205. For example, a subcarrier spacing for frequencies less than 6 GHz may be 15 kHz or 30 kHz. Additionally, or alternatively, a subcarrier spacing for frequencies greater than 6 GHz may be 120 kHz or 240 kHz. As described herein, the phrase "synchronization signal 205" may be used interchangeably to refer to SSBs, subcomponents of an SSB (e.g., PSSs, SSSs, PBCH payloads), or any other type of signal used for synchronizing timefrequency resources. For example, a PSS may be an example of a synchronization signal 205. Additionally, or alternatively, an SSB, which may include the PSS may be an example of a synchronization signal 205.

The network entity 105-*a* may use (e.g., generate, determine) a sequence for transmitting a synchronization signal 205 (e.g., a PSS, an SSS). The sequence may be a maximum length sequence (m-sequence), a Zadoff-Chu sequence, a Gold sequence, or any other type of sequence. In some cases, the sequence may have a length of 127 (e.g., 127 bits). Additionally, or alternatively, each bit of the sequence may correspond to or may otherwise be associated with a subcarrier for transmitting a synchronization signal 205 (e.g., a PSS, an SSS). For example, the network entity 105-*a* may transmit a PSS using an m-sequence with a 127 bit length. In some cases, the synchronization signal 205 may be modulated or otherwise transmitted according to the sequence. In some cases, the network entity 105-*a* may select a sequence (e.g., from a set or pool of sequences) for transmitting a synchronization signal 205.

A synchronization signal 205 may include an indication of a parameter (e.g., a cell identifier), which may correspond to or may be otherwise associated with a coverage area 110. In some cases, the indication of the parameter (e.g., cell identifier) may be based on one or more sequences used for transmitting a synchronization signal 205. In some cases, the network entity 105-*a* may indicate the parameter (e.g., cell identifier) using a PSS, an SSS, or both. For example, the network entity 105-*a* may transmit, a PSS using a first sequence and an SSS using a second sequence. The UE 115-*a* may receive the synchronization signals 205 (e.g., the PSS and the SSS) and may determine a cell identifier based on the first sequence, the second sequence, or both. In some cases, the UE 115-*a* may determine the parameter (e.g., cell identifier) (e.g., corresponding to a coverage area 110) and may camp on the identified cell to synchronize time-frequency resources with the network entity 105-*a*.

In some cases, a beam sweeping operation may enable the network entity 105-*a* and the UE 115-*a* to determine (e.g., select) respective beams 215 for communications. For example, the network entity 105-*a* may select a beam 215 for transmitting downlink communications and receiving uplink communications. The UE 115-*a* may select a beam 215 for transmitting uplink communications and receiving downlink communications. In such cases, each beam 215 used by the network entity 105-*a* may correspond to a beam 215 used by the UE 115-*a*. For example, a beam 215-*a* may correspond to a beam 215-*d*, a beam 215-*b* may correspond to a beam 215-*e*, and a beam 215-*c* may correspond to a beam 215-*f*.

As an illustrative example, the network entity 105-*a* may perform a beam sweeping operation to determine (e.g., select) a beam 215 for communications with the UE 115-*a*.

In some cases, the network entity 105-*a* may perform the beam sweeping operation as part of a synchronization operation. For example, the network entity 105-*a* may transmit multiple synchronization signals 205 using multiple beams 215. The network entity 105-*a* may transmit a synchronization signal 205-*a* using a beam 215-*a* (e.g., at a first time), a synchronization signal 205-*b* using a beam 215-*b* (e.g., at a second time), and a synchronization signal 205-*c* using a beam 215-*c* (e.g., at a third time).

The UE 115-*a* may receive one or more of the synchronization signals 205 and may determine one or more parameters (e.g., associated with a quality of each signal, channel, or beam 215) based on the received one or more synchronization signals 205. The UE 115-*a* may then select a beam 215 for communications with the network entity 105-*a*. For example, the UE 115-*a* may select a beam 215-*d* if the beam 215-*d* is associated with a relatively high channel quality when compared to other beams 215 (e.g., the beam 215-*e* and the beam 215-*f*). The UE 115-*a* may then transmit a random access channel (RACH) message to the network entity 105-*a* corresponding to a selected beam 215 (e.g., the beam 215-*d*). The network entity 105-*a* may receive the RACH message and determine to use the beam 215-*a*, which may correspond to the beam 215-*d*, for communications with the UE 115-*a*.

In some cases, the UE 115-*a* may transmit the RACH message to the network entity 105-*a* using a RACH occasion 210, which may correspond to a beam 215. For example, the network entity may transmit the synchronization signal 205-*a* using the beam 215-*a*. The RACH occasion 210-*a* may correspond to the synchronization signal 205-*a*. Accordingly, the UE 115-*a* may receive the synchronization signal 205-*a* and may transmit a RACH message to the network entity 105-*a* on the RACH occasion 210-*a*. In some cases, receiving the RACH message on the RACH occasion 210-*a* may indicate that the beam 215-*a* should be used for communications with the UE 115-*a*.

In some cases, the network entity 105-*a* and the UE 115-*a* may be equipped with multiple antenna ports. However, the network entity 105-*a* may transmit synchronization signals 205 (e.g., PSSs and SSSs) using a single antenna port. For example, the network entity 105-*a* may transmit PSSs and SSSs using TDM techniques (e.g., PSSs and SSSs are transmitted at different times), which may decrease throughput. Additionally, or alternatively, the UE 115-*a* may receive the synchronization signal 205 (e.g., one or more PSSs, one or more SSSs, or a combination thereof) and select a cell or a beam 215 (e.g., a beam direction) that does not support rank 2 or higher communications (e.g., the beam direction may support rank 1 communications) and accordingly decreases throughput performance.

In accordance with aspects of the present disclosure, the network entity 105-*a* may transmit synchronization signals 205 (e.g., PSSs, SSSs) using spatial multiplexing. For example, the network entity 105-*a* may transmit, in a same symbol, two PSSs using different sequences (e.g., m-sequences). The network entity 105-*a* may select the sequence for each synchronization signal 205 of the set of spatially multiplexed synchronization signals 205 from a set of sequences (e.g., a resource pool, a pool of sequence vectors, a pool of sequence matrices). Accordingly, the UE 115-*a* may monitor for the set of spatially multiplexed synchronization signals 205 during the same symbol. In some cases, the UE 115-*a* may differentiate each synchronization signal 205 based on a respective sequence used to transmit each synchronization signal. For example, the UE 115-*a* may be configured to identify that the set of synchronization signals 205 were transmitted by the network entity 105-a using multiple antenna ports based on determining that each synchronization signal 205 is based on a different sequence. Additionally, or alternatively, the UE 115-a may determine a parameter (e.g., cell identifier) for the network entity 105-b based on sequences for each synchronization signal 205.

Figure 3:
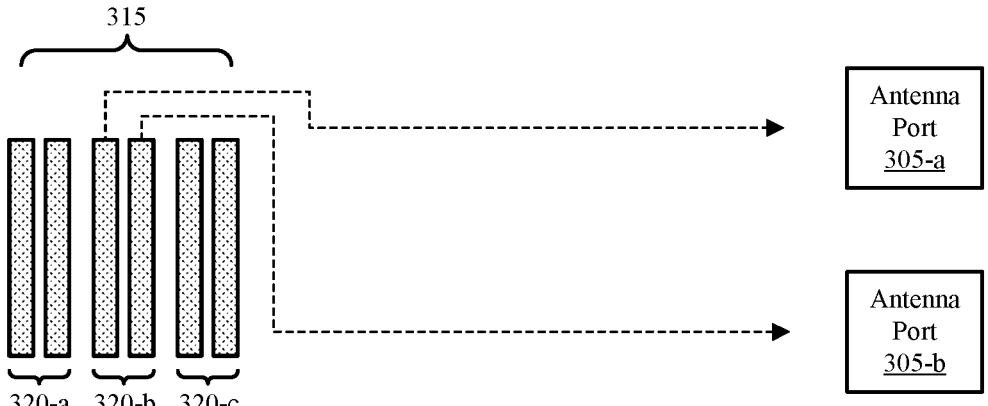
FIGS. 3-6 illustrates examples of communication configurations that support techniques for communicating synchronization signals in accordance with one or more aspects of the present disclosure.
Figure 3:

FIG. 3 illustrates an example of a communication configuration 300 that supports techniques for communicating synchronizations signals in accordance with one or more aspects of the present disclosure. One or more aspects of the communication configuration 300 may be implemented by one or more aspects of the wireless communications system 200 or the wireless communications system 100. For example, the communication configuration 300 may include an antenna port 305-a and an antenna port 305-b, which may be implemented by a network entity 105, as described with reference to FIGS. 1 and 2. Additionally, or alternatively, the communication configuration 300 may include PSSs 310, which may be transmitted by a network entity 105 (e.g., via one or more antenna ports 305). Each PSS 310 may be an example of or may be included in a synchronization signal 205, as described with reference to FIG. 2. The communication configuration 300 may also include a matrix pool 315 (e.g., a pool of 3 PSS matrices), which may include matrices 320 (e.g., PSS matrices). Each matrix 320 may include a set of PSSs 310 and each PSS 310 may correspond to (e.g., may be transmitted with) a different (e.g., unique) sequence. In some cases, a network entity 105 may select a matrix 320 based on a cell ID and may transmit the matrix 320 from the matrix pool 315 (e.g., select one matric from the pool of 3 PSS matrices) via multiple (e.g., two) antenna ports 305.

As described herein, a network entity 105 may be equipped with multiple antenna ports 305, which may be utilized for communicating PSSs 310 (e.g., spatially multiplexing PSSs 310). For example, the network entity 105 may simultaneously transmit (e.g., during a same symbol period) a first PSSs 310 using the antenna port 305-a and a second PSS 310 using the antenna port 305-b. For example, the network entity 105 may transmit two columns (e.g., two PSSs 310, two vectors) simultaneously (e.g., one column on antenna port 305-a and one column on antenna port 305-b). Each column of a matrix 320 may be a length 127 sequence (e.g., a length 127 m-sequence). Additionally, or alternatively, the network entity 105 may transmit the two columns on one OFDM symbol (e.g., an OFDM symbol for transmitting multi-port PSSs, wherein the PSSs are spatially multiplexed in the OFDM symbol period). A UE 115 within a coverage area of the network entity 105 may receive one or more of the PSSs 310 and may perform one or more operations to synchronize time-frequency resources with the network entity 105 based on the one or more PSSs 310. In some cases, the UE 115 may determine a parameter (e.g., cell identifier) based on the one or more PSSs 310 (e.g., based on an indication included in a PSS 310, based on a sequence for a PSS 310). Additionally, or alternatively, a UE 115 may select a beam 215 based on the one or more PSSs 310 (e.g., based one or more quality or signal strength parameters for each PSS 310).

In some cases, a PSS 310 may be associated with a sequence, such as an m-sequence. (e.g., a unique m-sequence). For example, a network entity 105 may transmit a PSS 310 using an m-sequence. An m-sequence for a PSS 310 may have a length of 127 bits. In some cases, each bit of the m-sequence may correspond to a respective frequency resource for a PSS 310 (e.g., a respective subcarrier for the PSS 310). A network entity 105 may select a matrix 320 from a matrix pool 315, where each matrix 320 includes two PSSs 310. The network entity may then simultaneously transmit each PSS 310 of the matrix 320 using respective antenna ports 305 (e.g., the network entity 105 may spatially multiplex the PSSs 310). Each PSS 310 may be mapped to (e.g., may correspond to) a sequence (e.g., a unique m-sequence). Additionally or alternatively, each sequence may be mapped to (e.g., may correspond to) a cell identifier. Accordingly, a UE 115 may receive multiple PSSs 310 (e.g., simultaneously, during a same symbol period) and may determine that the multiple PSSs 310 were transmitted using the antenna port 305-a and the antenna port 305-b (e.g., the UE 115 may determine that the PSSs 310 were spatially multiplexed) based on determining that each PSSs 310 has a different sequence.

In some cases, a UE 115 may detect and measure each PSS 310 (e.g., measure the energy of each signal) separately (e.g., using different antenna ports at the UE 115). In such cases, the UE 115 may determine a rank 2 or higher channel measurement based on receiving each PSS 310 separately. For example, the UE 115 may detect and measure the energy of the signal transmitted on the M-multiple Tx ports separately, which may yield a rank M channel measurement based on PSS/SSS. In an example, the UE 115 may measure a rank M channel based on PSS transmitted from each port of the M-port PSS. In another example, the UE 115 may measure a rank M channel based on SSS transmitted from each port of the M-port SSS. In another example, the UE 115 may measure rank M channel based on PSS transmitted from each port of the I-port PSS, and SSS transmitted from each port of the J-port SSS, where I+J=M.

Additionally, or alternatively, the UE 115 may select a beam 215 for communications with the network entity 105 based on the rank 2 or higher channel measurement. For example, the UE 115 may be configured to receive each PSS 310 of the matrix 320-b, separately, which may enable the UE 115 to determine one or more channel quality parameters for a rank 2 channel and select a beam 215 based on the one or more channel quality parameters. For example, the UE 115 may select a beam from a set of candidate beams based on a rank M channel measurement.

Figure 4:
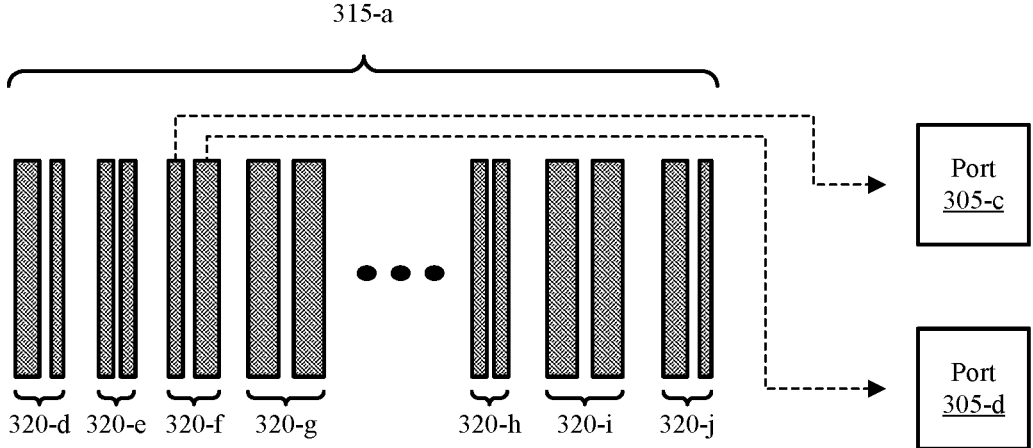

FIG. 4 illustrates an example of a communication configuration 400 that supports techniques for communicating synchronizations signals in accordance with one or more aspects of the present disclosure. One or more aspects of the communication configuration 400 may be implemented by one or more aspects of the wireless communications system 200 or the wireless communications system 100. For example, the communication configuration 400 may include an antenna port 305-c and an antenna port 305-d, which may be implemented by a network entity 105, as described with reference to FIGS. 1 and 2. Additionally, or alternatively, the communication configuration 400 may include SSSs 410, which may be transmitted by a network entity 105 (e.g., via one or more antenna ports 305). Each SSS 410 may be an example of or may be included in a synchronization signal 205, as described with reference to FIG. 2. The communication configuration 400 may also include a matrix pool 315-a (e.g., a pool of 336 SSS matrices), which may include matrices 320 (e.g., PSS matrices). Each matrix 320 may include a set of SSSs 410 and each SSS 410 may correspond to (e.g., may be transmitted with) a different (e.g., unique) sequence. In some cases, a network entity 105 may select a matrix 320 based on a cell ID and may transmit the matrix 320 from the matrix pool 315 (e.g., the pool of 336 SSS matrices) via multiple (e.g., two) antenna ports 305.

As described herein, a network entity 105 may be equipped with multiple antenna ports 305, which may be utilized for communicating SSSs 410 (e.g., spatially multiplexing SSSs 410). For example, the network entity 105 may simultaneously transmit (e.g., during a same symbol period) a first SSS 410 using the antenna port 305-*c* and a second SSS 410 using the antenna port 305-*d*. For example, the network entity 105 may transmit two columns (e.g., two SSSs 410, two vectors) simultaneously (e.g., one column on antenna port 305-*c* and one column on antenna port 305-*d*). Each column of a matrix 320 may be a length 127 sequence (e.g., a length 127 m-sequence). Additionally, or alternatively, the network entity 105 may transmit the two columns on one OFDM symbol (e.g., an OFDM symbol for transmitting multi-port SSSs that are spatially multiplexed in a same OFDM symbol period). A UE 115 within a coverage area of the network entity 105 may receive one or more of the SSSs 410 and may perform one or more operations to synchronize time-frequency resources with the network entity 105 based on the one or more SSSs 410. In some cases, the UE 115 may determine a cell identifier based on the one or more SSSs 410 (e.g., an indication included in an SSS 410, a sequence for an SSS 410).

In some cases, an SSS 410 may be associated with a sequence, such as an m-sequence. (e.g., a unique m-sequence). For example, a network entity 105 may transmit an SSS 410 using an m-sequence. An m-sequence for an SSS 410 may have a length of 127 bits. In some cases, each bit of the m-sequence may correspond to a respective frequency resource for an SSS 410 (e.g., a respective subcarrier for an SSS 410). A network entity 105 may select one or more SSSs 410 from a matrix pool 315-*a*. The matrix pool 315-*a* may include multiple matrices 320, where each matrix 320 includes two SSSs 410. Each SSS 410 may be mapped to (e.g., may correspond to) a sequence (e.g., a unique m-sequence). Additionally or alternatively, each sequence may be mapped to (e.g., may correspond to) a cell identifier. Accordingly, a UE 115 may receive multiple SSSs 410 (e.g., simultaneously, during a same symbol period) and may determine that the multiple SSSs 410 were transmitted using the antenna port 305-*c* and the antenna port 305-*d* (e.g., the UE 115 may determine that the SSSs 410 were spatially multiplexed) based on determining that each SSSs 410 has a different sequence.

In some cases, a UE 115 may detect and measure each SSS 410 separately (e.g., using different antenna ports at the UE 115). In such cases, the UE 115 may determine a rank 2 or higher channel measurement based on receiving each SSS 410 separately. Additionally, or alternatively, the UE 115 may select a beam 215 for communications with the network entity 105 based on the rank 2 or higher channel measurement. For example, the UE 115 may be configured to receive each SSS 410 of the matrix 320-*f*, separately, which may enable the UE 115 to determine one or more channel quality parameters for a rank 2 channel and select a beam 215 based on the one or more channel quality parameters.

Figure 5:
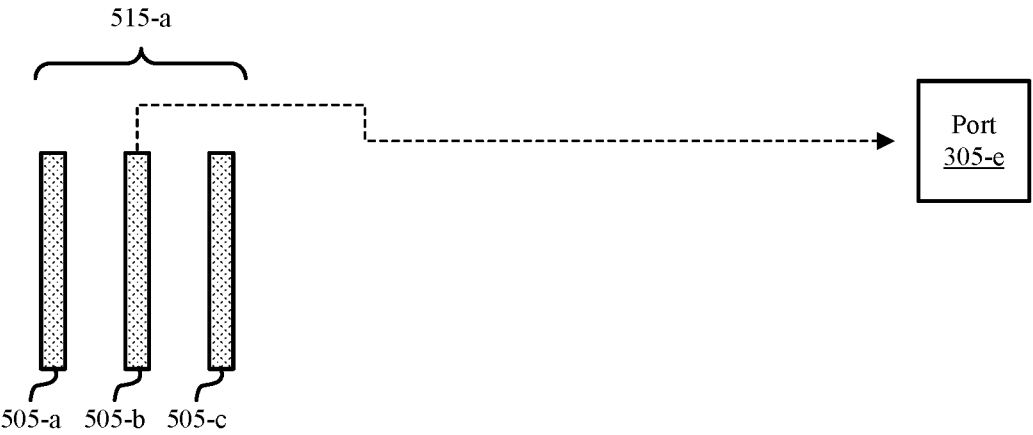
Figure 5:
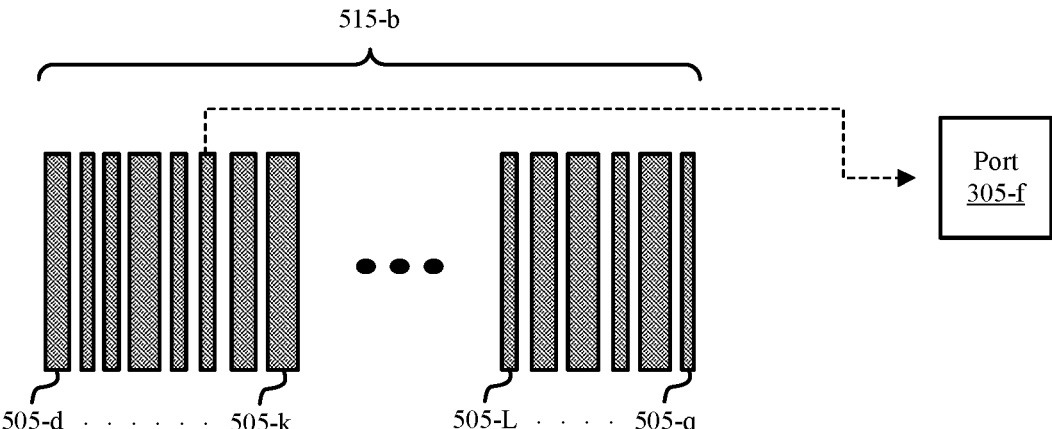

FIG. 5 illustrates an example of a communication configuration 500 that supports techniques for communicating synchronizations signals in accordance with one or more aspects of the present disclosure. One or more aspects of the communication configuration 500 may be implemented by one or more aspects of the wireless communications system 200 or the wireless communications system 100. For example, the communication configuration 500 may include an antenna port 305-*e* and an antenna port 305-*f*, which may be implemented by a network entity 105, as described with reference to FIGS. 1 and 2. Additionally, or alternatively, the communication configuration 500 may include PSSs 310 and SSSs 410, which may be transmitted by a network entity

105 (e.g., via one or more antenna ports 305). Each PSS 310 and each SSS 410 may be an example of or may be included in a synchronization signal 205, as described with reference to FIG. 2. The communication configuration 500 may also include vector pools 515 (e.g., sequence pools), which may include vectors 505 (e.g., sequences). For example, the vector pool 515-*a* may be an example of a pool of 3 PSS sequences (e.g., 3 PSS vectors) and the vector pool 515-*b* may be an example of a pool of 336 SSS sequences (e.g., 336 SSS vectors). Each vector 505 may include a PSS 310 or an SSS 410 corresponding to a different (e.g., unique) sequence. In some cases, a network entity 105 may select a vector 505 (e.g., a sequence) based on a cell ID and may transmit the vector 505 (e.g., the sequence) from the vector pool 515 via one or more antenna ports 305.

As described herein, a network entity 105 may be equipped with multiple antenna ports 305, which may be utilized for communicating PSSs 310 and SSSs 410 (e.g., spatially multiplexing PSSs 310 and SSSs 410). For example, the network entity 105 may simultaneously transmit a PSS 310 using the antenna port 305-*c* and an SSS 410 using the antenna port 305-*f*. For example, the network entity 105 may transmit two vectors 505 (e.g., sequences) simultaneously (e.g., one vector 505 on antenna port 305-*e* and one vector 505 on antenna port 305-*f*). Each vector 505 may be a length 127 sequence (e.g., a length 127 m-sequence). Additionally, or alternatively, the network entity 105 may transmit the two vectors 505 on one OFDM symbol (e.g., an OFDM symbol for transmitting multi-port synchronization signals 205 that spatially multiplexes a PSS and an SSS in a same OFDM symbol period). In some cases, each vector 505 may be mapped to 127 tones. A UE 115 within a coverage area of the network entity 105 may receive the one or more PSSs 310 and the one or more SSSs 410 (e.g., during a same symbol period) and may perform one or more operations to synchronize time-frequency resources with the network entity 105 based on the one or more PSSs 310 and the one or more SSSs 410. In some cases, the UE 115 may determine a cell identifier based on the one or more PSSs 310 and the one or more SSSs 410 (e.g., an indication included in a PSS 310 and an indication included in an SSS 410, a sequence for a PSS 310 and a sequence for an SSS 410). For example, a UE 115 may determine a cell identifier based on combining a first value indicated by a PSS 310 and a second value indicated by an SSS 410.

In some cases, each PSS 310 and each SSS 410 may be associated with respective sequences, such as m-sequences. For example, a network entity 105 may transmit a PSS 310 using a first m-sequence and an SSS 410 using a second m-sequence. An m-sequence (e.g., for a PSS 310 or for an SSS 410) may have a length of 127 bits. In some cases, each bit of the m-sequence may correspond to a respective frequency resource for a PSS 310 or an SSS 410 (e.g., a respective subcarrier). A network entity 105 may select a PSSs 310 from a vector pool 515-*a* and an SSS 410 from a vector pool 515-*b*. Each vector pool 515 may include multiple vectors 505, where each vector 505 includes a PSS 310 or an SSS 410. Each PSS 310 and each SSS 410 may be mapped to (e.g., may correspond to) a sequence (e.g., a unique m-sequence). Additionally or alternatively, each sequence may be mapped to (e.g., may correspond to) a cell identifier. Accordingly, a UE 115 may receive one or more PSSs 310 and one or more SSSs 410 (e.g., simultaneously, during a same symbol period) and may determine that the one or more PSSs 310 were transmitted using the antenna port 305-*e* and the one or more SSSs 410 were transmitted using the antenna port 305-*f* (e.g., the UE 115 may determine that the one or more PSSs 310 and the one or more SSSs 410 were spatially multiplexed) based on determining that each PSS 310 and each SSSs 410 has a different sequence.

In some cases, a UE 115 may detect and measure each PSS 310 and each SSS 410 separately (e.g., using different antenna ports at the UE 115). In such cases, the UE 115 may determine a rank 2 or higher channel measurement based on receiving each PSS 310 and each SSS 410 separately. Additionally, or alternatively, the UE 115 may select a beam 215 for communications with the network entity 105 based on the rank 2 or higher channel measurement. For example, the UE 115 may be configured to receive each PSS 310 separately from each SSS 410, which may enable the UE 115 to determine one or more channel quality parameters for a rank 2 channel and select a beam 215 based on the one or more channel quality parameters.

Figure 6:
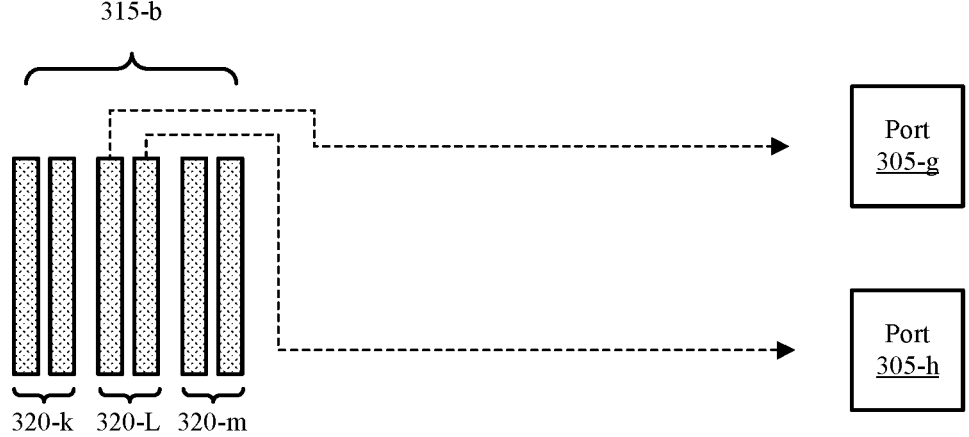
Figure 6:
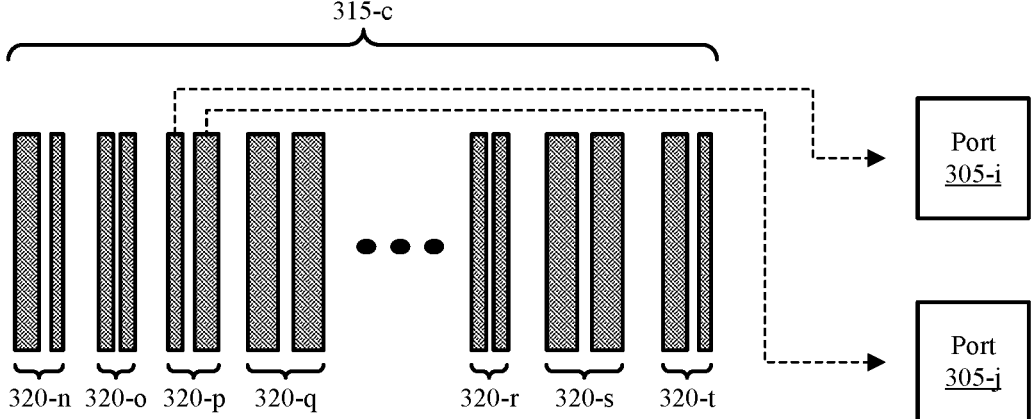

FIG. 6 illustrates an example of a communication configuration 600 that supports techniques for communicating synchronizations signals in accordance with one or more aspects of the present disclosure. One or more aspects of the communication configuration 600 may be implemented by one or more aspects of the wireless communications system 200 or the wireless communications system 100. For example, the communication configuration 600 may include an antenna port 305-*g*, an antenna port 305-*h*, an antenna port 305-*i*, and an antenna port 305-*j*, which may be implemented by a network entity 105, as described with reference to FIGS. 1 and 2. Additionally, or alternatively, the communication configuration 600 may include PSSs 310 and SSSs 410, which may be transmitted by a network entity 105 (e.g., via one or more antenna ports 305). Each PSS 310 and each SSS 410 may be an example of or may be included in a synchronization signal 205, as described with reference to FIG. 2. The communication configuration 600 may also include matrix pools 315 (e.g., a pool of 3 PSS matrices and a pool of 366 SSS matrices), which may include matrices 320 (e.g., PSS matrices and SSS matrices). Each matrix 320 may include a set of PSSs 310 or a set of SSSs 410, each PSS 310 and each SSS 410 corresponding to a different (e.g., unique) sequence. In some cases, a network entity 105 may select a matrix 320 based on a cell ID and may transmit the matrix 320 from the matrix pool 315 via multiple (e.g., two or more) antenna ports 305. For example, network entity 105 may spatially multiplex PSS and SSS on a same OFDM symbol to form in total M ports, where PSS has I ports and SSS has J ports, and I+J=M. The following provides an example where M=4, I=2, and J=2. In another example, M=3, I=1, and J=2, to permit for a single port PSS and a multi-port SSS.

As described herein, a network entity 105 may be equipped with multiple antenna ports 305, which may be utilized for communicating PSSs 310 and SSSs 410 (e.g., spatially multiplexing PSSs 310 and SSSs 410 in a same OFDM symbol period). For example, the network entity 105 may simultaneously transmit multiple PSSs 310 and multiple SSSs 410 over a PBCH (e.g., during a same symbol period). That is, the network entity 105 may concurrently transmit (e.g., on one OFDM symbol) a first PSS 310 (e.g., a first column of a matrix 320-L) using the antenna port 305-*g*, a second PSS 310 (e.g., a second column of the matrix 320-L) using the antenna port 305-*h*, a first SSS 410 (e.g., a first column of a matrix 320-*p*) using the antenna port 305-*i*, and a second SSS 410 (e.g., a second column of the matrix 320-*p*) using the antenna port 305-*j*. A UE 115 within a coverage area of the network entity 105 may receive the multiple PSSs 310 and the multiple SSSs 410 (e.g., during a same symbol period) and may perform one or more operations to synchronize time-frequency resources with the network entity 105 based on the multiple PSSs 310 and the multiple SSSs 410. In some cases, the UE 115 may determine one or more parameters (e.g., cell identifiers) based on the multiple PSSs 310 and the multiple SSSs 410 (e.g., an indication included in one or more PSSs 310 and an indication included in one or more SSSs 410). For example, a UE 115 may determine a parameter (e.g., cell identifier) based on combining a first value indicated by a PSS 310 and a second value indicated by an SSS 410.

In some cases, each PSS 310 and each SSS 410 may be associated with respective sequences, such as m-sequences. For example, a network entity 105 may transmit a PSS 310 using a first m-sequence and an SSS 410 using a second m-sequence. An m-sequence (e.g., for a PSS 310 or for an SSS 410) may have a length of 127 bits. In some cases, each bit of the m-sequence may correspond to a respective frequency resource for a PSS 310 or an SSS 410 (e.g., a respective subcarrier). A network entity 105 may select a set of PSSs 310 (e.g., a matrix 320) from a matrix pool 315-*b* and may select a set of SSSs 410 (e.g., a matrix 320) from a matrix pool 315-*c*. Each matrix pool 315 may include multiple matrices 320, where each matrix 320 includes a set of PSSs 310 or a set of SSSs 410. Each PSS 310 and each SSS 410 may be mapped to (e.g., may correspond to) a sequence (e.g., a unique m-sequence). Additionally or alternatively, each sequence may be mapped to (e.g., may correspond to) a parameter (e.g., cell identifier). Accordingly, a UE 115 may receive multiple PSSs 310 and multiple SSSs 410 (e.g., simultaneously, during a same symbol period) and may determine that the multiple PSSs 310 were transmitted using the antenna port 305-*g* and the antenna port 305-*h*. Additionally, or alternatively, the UE 115 may determine that the multiple SSSs 410 were transmitted using the antenna port 305-*i* and the antenna port 305-*j* (e.g., the UE 115 may determine that the multiple PSSs 310 were spatially multiplexed with the one or more SSSs 410) based on determining that each PSS 310 and each SSSs 410 has a different sequence.

Figure 7:
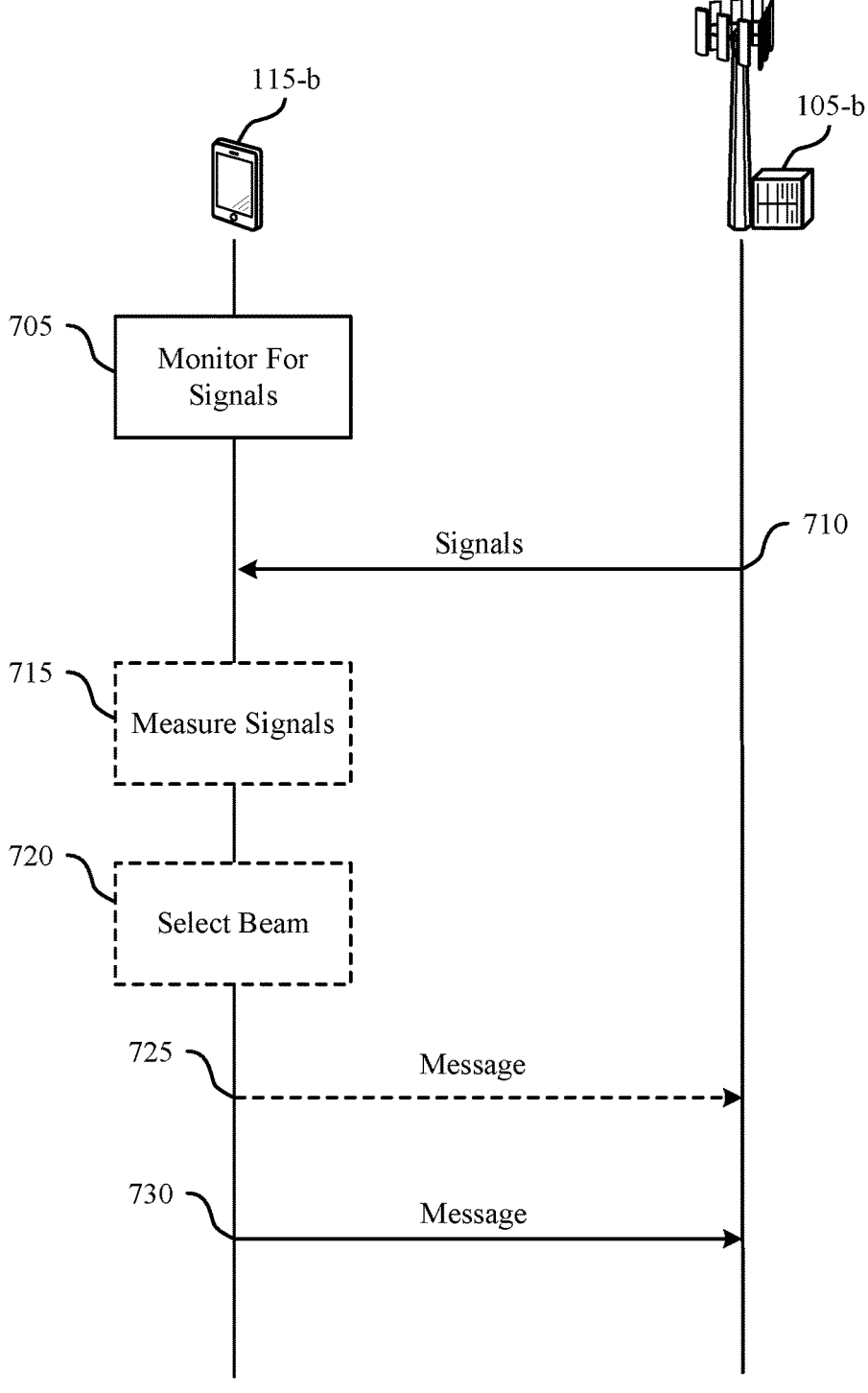
FIG. 7 illustrates an example of a process flow that supports techniques for communicating synchronization signals in accordance with one or more aspects of the present disclosure.

FIG. 7 illustrates an example of a process flow 700 that supports techniques for communicating synchronization signals in accordance with one or more aspects of the present disclosure. The process flow 700 may implement one or more aspects of the wireless communications systems 100 and 200. For example, the process flow 700 may include a UE 115-*b* and a network entity 105-*b*, which may be examples of UEs 115 and network entities 105, as described with reference to FIGS. 1 and 2. Additionally, or alternatively, the process flow 700 may implement one or more aspects of communication configurations 300, 400, 500, and 600. For example, the UE 115-*b* and the network entity 105-*b* may communicate synchronization signals (e.g., PSSs 310 and SSSs 410), which may be examples of synchronization signals as described with reference to FIGS. 3-6.

In the following description of process flow 700, the operations between the UE 115-*b* and the network entity 105-*b* may be transmitted in a different order than the order shown, or the operations may be performed at different times. Some operations may also be left out of process flow 700, or other operations may be added to process flow 700. While the UE 115-*b* is shown performing a number of the operations of process flow 700, any wireless device may perform the operations shown. For example, the network entity 105-*b* may perform the operations shown.

At 705, the UE 115-*b* may monitor, during a symbol period, a plurality of frequency resources for a set of spatially multiplexed synchronization signals. The set of spatially multiplexed synchronization signals may be associated with a plurality of antenna ports. For example, the network entity 105-*b* may transmit the spatially multiplexed synchronization signals using multiple antenna ports and the UE 115-*b* may receive the spatially multiplexed synchronization signals using multiple antenna ports. In some cases, each antenna port may include multiple antennas. Additionally, or alternatively, the UE 115-*b* may monitor for the set of spatially multiplexed synchronization signals using multiple antenna ports. The set of spatially multiplexed synchronization signals may include any combination of PSSs 310 and SSSs 410. In some cases, monitoring for the set of spatially multiplexed synchronization signals may include performing one or more operations to monitor for or receive signaling. For example, the UE 115-*b* may activate one or more antenna ports for the symbol period to monitor for the set of spatially multiplexed synchronization signals.

At 710, the UE 115-*b* may receive during the symbol period, the set of spatially multiplexed synchronization signals. The set of spatially multiplexed synchronization signals may indicate a parameter (e.g., cell identifier) for the network entity 105-*b*. In some cases, receiving the set of spatially multiplexed synchronization signals may include receiving, during the symbol period, the first synchronization signal having a first sequence and corresponding to a first antenna port of the plurality of antenna ports. Receiving the set of spatially multiplexed synchronization signals may also include receiving, during the symbol period, a second synchronization signal of the set of spatially multiplexed synchronization signals, the second synchronization signal having a second sequence different from the first sequence and corresponding to a second antenna port of the plurality of antenna ports.

In some cases, receiving the set of spatially multiplexed synchronization signals may include receiving, during the symbol period, a first synchronization signal spatially multiplexed with a second synchronization signal. The first synchronization signal may include a first PSS 310 corresponding to (e.g., received by) a first antenna port of the plurality of antenna ports (e.g., of the UE 115-*b*) and the second synchronization signal may include a second PSS 310 corresponding to (e.g., received by) a second antenna port of the plurality of antenna ports (e.g., of the UE 115-*b*). Additionally, or alternatively, receiving the set of spatially multiplexed synchronization signals may include receiving, during the symbol period, a first synchronization signal spatially multiplexed with a second synchronization signal. The first synchronization signal may include a first SSS 410 corresponding to (e.g., received by) a first antenna port of the plurality of antenna ports (e.g., of the UE 115-*b*) and the second synchronization signal may include a second SSS 410 corresponding to (e.g., received by) a second antenna port of the plurality of antenna ports (e.g., of the UE 115-*b*).

Receiving the set of spatially multiplexed synchronization signals may include receiving, during the symbol period, a first synchronization signal spatially multiplexed with a second synchronization signal. The first synchronization signal may include a PSS 310 corresponding to (e.g., received by) a first antenna port of the plurality of antenna ports (e.g., of the UE 115-*b*) and the second synchronization signal may include an SSS 410 corresponding to (e.g., received by) a second antenna port of the plurality of antenna ports (e.g., of the UE 115-*b*). Additionally, or alternatively, receiving the set of spatially multiplexed synchronization signals may include receiving, during the symbol period, a first PSS 310 corresponding to (e.g., received by) a first antenna port of the plurality of antenna ports (e.g., of the UE 115-*b*), a second PSS 310 corresponding to (e.g., received by) a second antenna port of the plurality of antenna ports (e.g., of the UE 115-*b*), a first SSS 410 corresponding to (e.g., received by) a third antenna port of the plurality of antenna ports (e.g., of the UE 115-*b*), and a second SSS 410 corresponding to (e.g., received by) a fourth antenna port of the plurality of antenna ports (e.g., of the UE 115-*b*).

At 715, the UE 115-*b* may measure a first synchronization signal of the set of spatially multiplexed synchronization signals via first antenna port of the plurality of antenna ports and a second synchronization signal of the set of spatially multiplexed synchronization signals via a second antenna port of the plurality of antenna ports. For example, the UE 115-*b* may measure a signal quality (e.g., a signal quality parameter) of the first synchronization signal and the second synchronization signal. In some other cases, the UE 115-*b* may measure a signal power (e.g., a signal power parameter) of the first synchronization signal and the second synchronization signal. In some cases, the UE 115-*b* may measure the first synchronization signal and the second synchronization signal as part of a beam management operation or as part of a beam selection operation.

At 720, the UE 115-*b* may select a first beam from a plurality of beams based on measuring the first synchronization signal via the first antenna port and measuring the second synchronization signal via the second antenna port. For example, the UE 115-*b* may determine one or more parameters associated with the first beam based on measuring the first synchronization signal. Additionally, or alternatively, the UE 115-*b* may determine one or more parameters associated with the second beam based on measuring the second synchronization signal. In some cases, the one or more parameters may be signal strength or signal quality parameters.

At 725, the UE 115-*b* may transmit to the network entity 105-*b*, a RACH message using a first random access occasion (e.g., a RACH occasion 210) of a plurality of different random access occasions. In some cases, the first random access occasion may be associated with the first beam. In some cases, the UE 115-*b* may transmit the RACH message to the network entity 105-*b* as part of a beam selection or beam management procedure. For example, the network entity 105-*b* may receive the RACH message and may determine to communicate using a beam corresponding to the first beam based on receiving the RACH message (e.g., based on determining that the RACH message or the random access occasion corresponds to the first beam).

At 730, the UE 115-*b* may transmit, to a network entity 105-*b*, a first message based on the parameter (e.g., cell identifier). For example, the first message may communicate information (e.g., data) to the network entity 105-*b*. In some other case, the first message may be an example of control signaling and may communicate control information to the network entity 105-*b*. Additionally, or alternatively, the UE 115-*b* may transmit the first message using the first beam. In some cases, each antenna port (e.g., of the UE 115-*b* or of the network entity 105-*b*) may include one or more antennas. Additionally, or alternatively, the symbol period may be an example of an OFDM symbol period.

Figure 8:
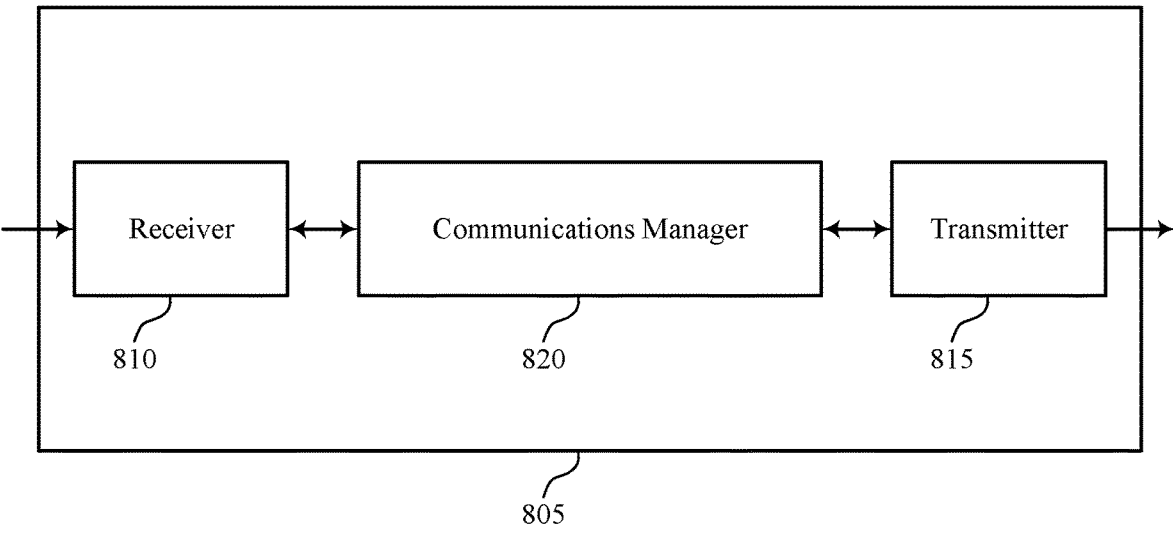
FIGS. 8 and 9 show block diagrams of devices that support techniques for communicating synchronization signals in accordance with one or more aspects of the present disclosure.

FIG. 8 shows a block diagram 800 of a device 805 that supports techniques for communicating synchronization signals in accordance with one or more aspects of the present disclosure. The device 805 may be an example of aspects of a UE 115 as described herein. The device 805 may include a receiver 810, a transmitter 815, and a communications manager 820. The device 805 may also include a processor.

Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for communicating synchronization signals). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for communicating synchronization signals). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for communicating synchronization signals as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. For example, the communications manager 820 may be configured as or otherwise support a means for monitoring, during a symbol period, a set of multiple frequency resources for a set of spatially multiplexed synchronization signals, the set of spatially multiplexed synchronization signals associated with a set of multiple antenna ports. The communications manager 820 may be configured as or otherwise support a means for receiving, during the symbol period, the set of spatially multiplexed synchronization signals, where the set of spatially multiplexed synchronization signals indicates a parameter (e.g., cell identifier) for a network entity. The communications manager 820 may be configured as or otherwise support a means for transmitting, to a network entity, a first message based on the parameter.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for more effectively communicating synchronization signals. For example, the device 805 may support techniques for spatial multiplexing of synchronization signals, which may increase utilization of communication resources. Additionally, or alternatively, the device 805 may support techniques for beam management associated with synchronization signaling. For example, the device 805 may select one or more beams for communications based on determining that synchronization signals are spatially multiplexed. In some cases, communicating spatially multiplexed synchronization signals may improve utilization of communication resources and may reduce power consumption.

Figure 9:
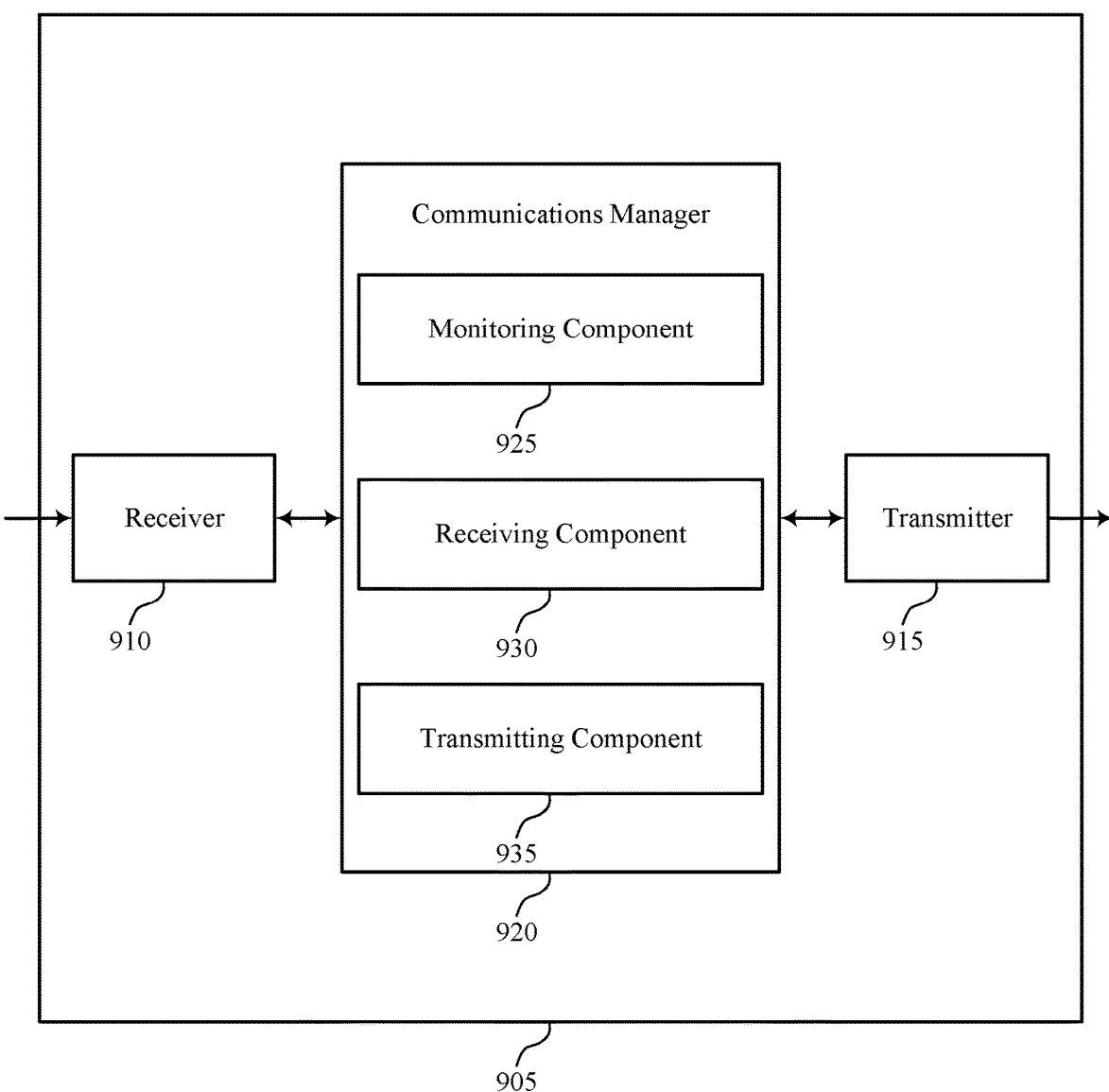

FIG. 9 shows a block diagram 900 of a device 905 that supports techniques for communicating synchronization signals in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for communicating synchronization signals). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for communicating synchronization signals). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for communicating synchronization signals as described herein. For example, the communications manager 920 may include a monitoring component 925, a receiving component 930, a transmitting component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. The monitoring component 925 may be configured as or otherwise support a means for monitoring, during a symbol period, a set of multiple frequency resources for a set of spatially multiplexed synchronization signals, the set of spatially multiplexed synchronization signals associated with a set of multiple antenna ports. The receiving component 930 may be configured as or otherwise support a means for receiving, during the symbol period, the set of spatially multiplexed synchronization signals, where the set of spatially multiplexed synchronization signals indicates a parameter (e.g., cell identifier) for a network entity. The transmitting component 935 may be configured as or otherwise support a means for transmitting, to a network entity, a first message based on the parameter (e.g., cell identifier).

Figure 10:
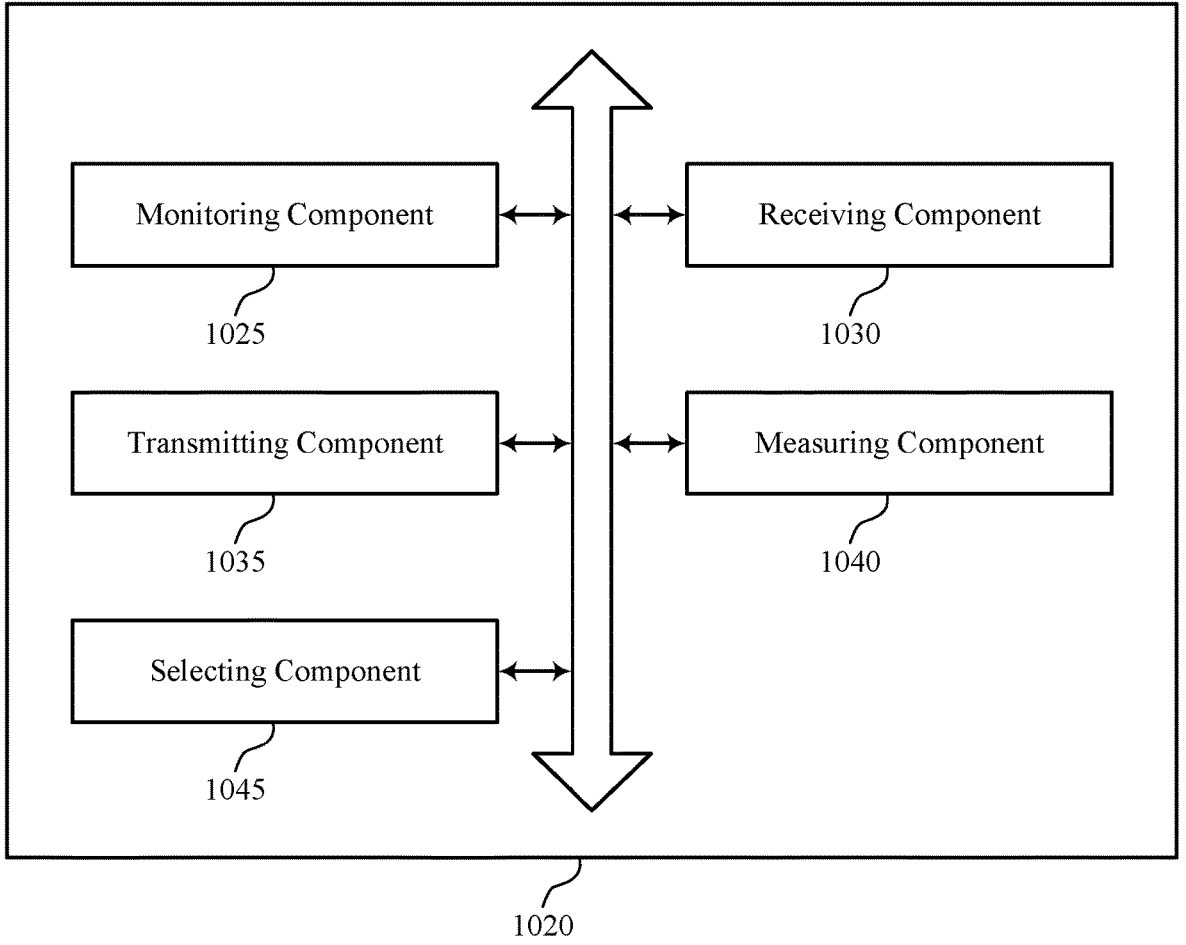
FIG. 10 shows a block diagram of a communications manager that supports techniques for communicating synchronization signals in accordance with one or more aspects of the present disclosure.

FIG. 10 shows a block diagram 1000 of a communications manager 1020 that supports techniques for communicating synchronization signals in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for communicating synchronization signals as described herein. For example, the communications manager 1020 may include a monitoring component 1025, a receiving component 1030, a transmitting component 1035, a measuring component 1040, a selecting component 1045, or any combination thereof. Each of these components may communicate, directly or indirectly, with one another (e.g., via one or more buses).

The communications manager 1020 may support wireless communication at a UE in accordance with examples as disclosed herein. The monitoring component 1025 may be configured as or otherwise support a means for monitoring, during a symbol period, a set of multiple frequency resources for a set of spatially multiplexed synchronization signals, the set of spatially multiplexed synchronization signals associated with a set of multiple antenna ports. The receiving component 1030 may be configured as or otherwise support a means for receiving, during the symbol period, the set of spatially multiplexed synchronization signals, where the set of spatially multiplexed synchronization signals indicates a parameter (e.g., cell identifier) for a network entity. The transmitting component 1035 may be configured as or otherwise support a means for transmitting, to a network entity, a first message based on the parameter (e.g., cell identifier).

In some examples, to support receiving the set of spatially multiplexed synchronization signals, the receiving component 1030 may be configured as or otherwise support a means for receiving, during the symbol period, a first synchronization signal of the set of spatially multiplexed synchronization signals, the first synchronization signal associated with a first sequence and a first antenna port of the set of multiple antenna ports. In some examples, to support receiving the set of spatially multiplexed synchronization signals, the receiving component 1030 may be configured as or otherwise support a means for receiving, during the symbol period, a second synchronization signal of the set of spatially multiplexed synchronization signals, the second synchronization signal associated with a second sequence different from the first sequence and a second antenna port of the set of multiple antenna ports.

In some examples, to support receiving the set of spatially multiplexed synchronization signals, the receiving component 1030 may be configured as or otherwise support a means for receiving, during the symbol period, a first synchronization signal spatially multiplexed with a second synchronization signal, the first synchronization signal including a first primary synchronization signal associated with a first antenna port of the set of multiple antenna ports and the second synchronization signal including a second primary synchronization signal associated with a second antenna port of the set of multiple antenna ports.

In some examples, to support receiving the set of spatially multiplexed synchronization signals, the receiving component 1030 may be configured as or otherwise support a means for receiving, during the symbol period, a first synchronization signal spatially multiplexed with a second synchronization signal, the first synchronization signal including a first secondary synchronization signal associated with a first antenna port of the set of multiple antenna ports and the second synchronization signal including a second secondary synchronization signal associated with a second antenna port of the set of multiple antenna ports.

In some examples, to support receiving the set of spatially multiplexed synchronization signals, the receiving component 1030 may be configured as or otherwise support a means for receiving, during the symbol period, a first synchronization signal spatially multiplexed with a second synchronization signal, the first synchronization signal including a primary synchronization signal associated with a first antenna port of the set of multiple antenna ports and the second synchronization signal including a secondary synchronization signal associated with a second antenna port of the set of multiple antenna ports.

In some examples, to support receiving the set of spatially multiplexed synchronization signals, the receiving component 1030 may be configured as or otherwise support a means for receiving, during the symbol period, a first primary synchronization signal associated with a first antenna port of the set of multiple antenna ports, a second primary synchronization signal associated with a second antenna port of the set of multiple antenna ports, a first secondary synchronization signal associated with a third antenna port of the set of multiple antenna ports, and a second secondary synchronization signal associated with a fourth antenna port of the set of multiple antenna ports.

In some examples, the measuring component 1040 may be configured as or otherwise support a means for measuring a first synchronization signal of the set of spatially multiplexed synchronization signals via first antenna port of the set of multiple antenna ports and a second synchronization signal of the set of spatially multiplexed synchronization signals via a second antenna port of the set of multiple antenna ports.

In some examples, the selecting component 1045 may be configured as or otherwise support a means for selecting a first beam from a set of multiple beams based on measuring the first synchronization signal via the first antenna port and measuring the second synchronization signal via the second antenna port. In some examples, the transmitting component 1035 may be configured as or otherwise support a means for transmitting, to the network entity, a random access message using a first random access occasion of a set of multiple different random access occasions, the first random access occasion associated with the first beam.

In some examples, each antenna port is associated with one or more antennas.

In some examples, the symbol period includes an orthogonal frequency-division multiplexing symbol period.

Figure 11:
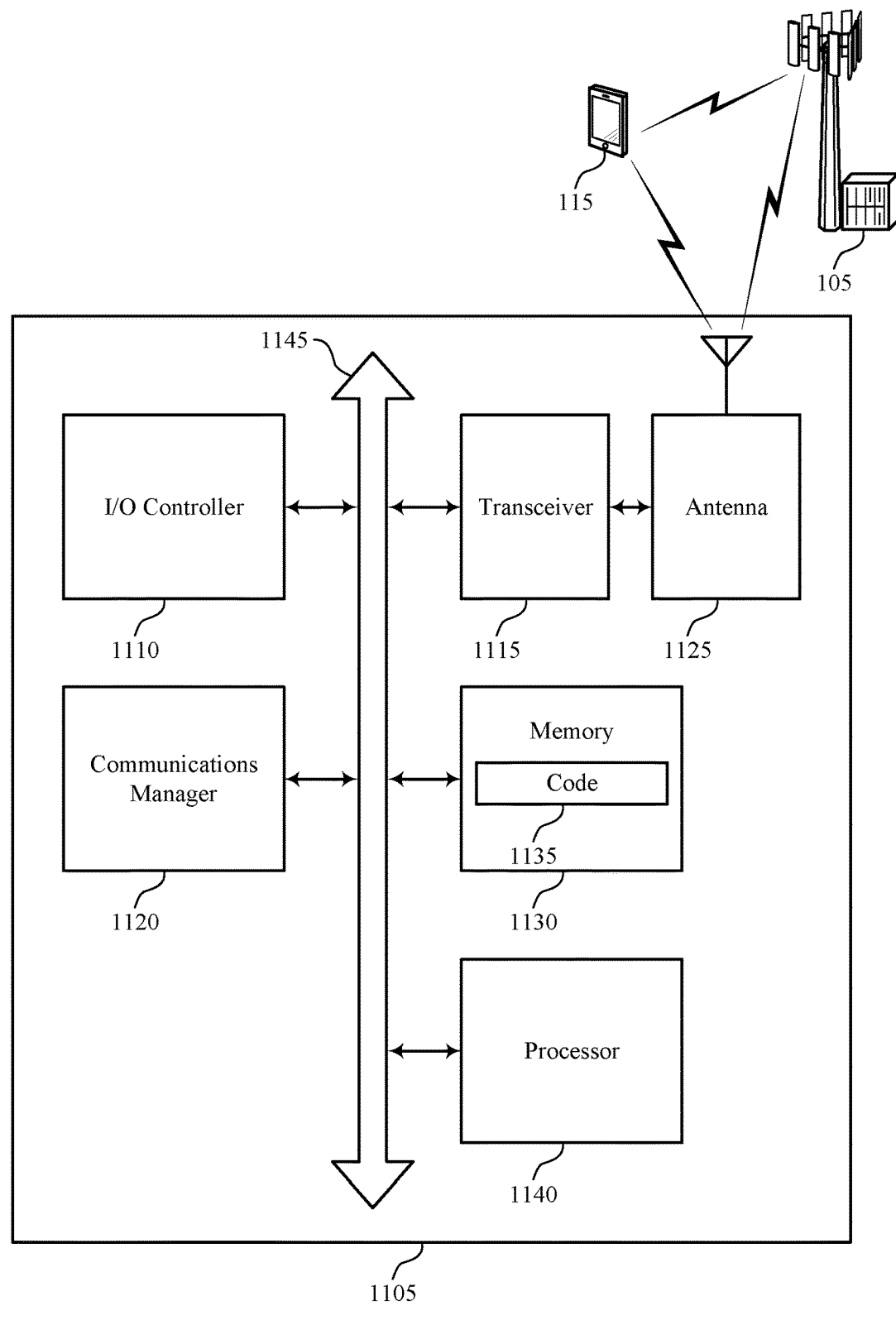
FIG. 11 shows a diagram of a system including a device that supports techniques for communicating synchronization signals in accordance with one or more aspects of the present disclosure.

FIG. 11 shows a diagram of a system 1100 including a device 1105 that supports techniques for communicating synchronization signals in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125.

The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for communicating synchronization signals). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for monitoring, during a symbol period, a set of multiple frequency resources for a set of spatially multiplexed synchronization signals, the set of spatially multiplexed synchronization signals associated with a set of multiple antenna ports. The communications manager 1120 may be configured as or otherwise support a means for receiving, during the symbol period, the set of spatially multiplexed synchronization signals, where the set of spatially multiplexed synchronization signals indicates a parameter (e.g., cell identifier) for a network entity. The communications manager 1120 may be configured as or otherwise support a means for transmitting, to a network entity, a first message based on the parameter (e.g., cell identifier).

By including or configuring the communications manager 1120 in accordance with examples as described herein, the device 1105 may support techniques for more effectively communicating synchronization signals. For example, the device 1105 may support techniques for spatial multiplexing of synchronization signals, which may improve throughput. Additionally, or alternatively, the device 1105 may support techniques for beam management associated with synchronization signaling. For example, the device 1105 may select one or more beams for communications based on determining that synchronization signals are spatially multiplexed. In some cases, communicating spatially multiplexed synchronization signals may improve utilization of communication resources and may improve coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for communicating synchronization signals as described herein, or the processor 1140 and the memory 1130 may be otherwise configured to perform or support such operations.

Figure 12:
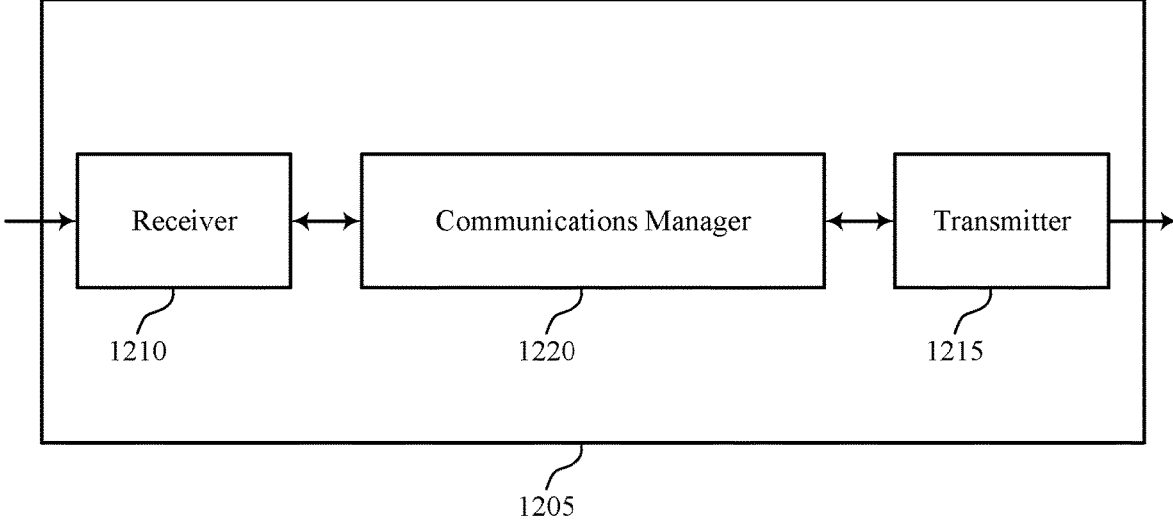
FIGS. 12 and 13 show block diagrams of devices that support techniques for communicating synchronization signals in accordance with one or more aspects of the present disclosure.

FIG. 12 shows a block diagram 1200 of a device 1205 that supports techniques for communicating synchronization signals in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of techniques for communicating synchronization signals as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. For example, the communications manager 1220 may be configured as or otherwise support a means for transmitting a first synchronization signal to a UE during a symbol period using a first antenna port. The communications manager 1220 may be configured as or otherwise support a means for transmitting a second synchronization signal to the UE during the symbol period using a second antenna port, where the second synchronization signal is spatially multiplexed with the first synchronization signal. The communications manager 1220 may be configured as or otherwise support a means for receiving, from the UE, a first message based on a parameter (e.g., cell identifier) indicated by the first synchronization signal and the second synchronization signal.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for more effectively communicating synchronization signals. For example, the device 1205 may support techniques for spatial multiplexing of synchronization signals, which may increase utilization of communication resources. Additionally, or alternatively, the device 1205 may support techniques for beam management associated with synchronization signaling. For example, the device 1205 may select one or more beams for communications based on determining that synchronization signals are spatially multiplexed. In some cases, communicating spatially multiplexed synchronization signals may improve utilization of communication resources and may reduce power consumption.

Figure 13:
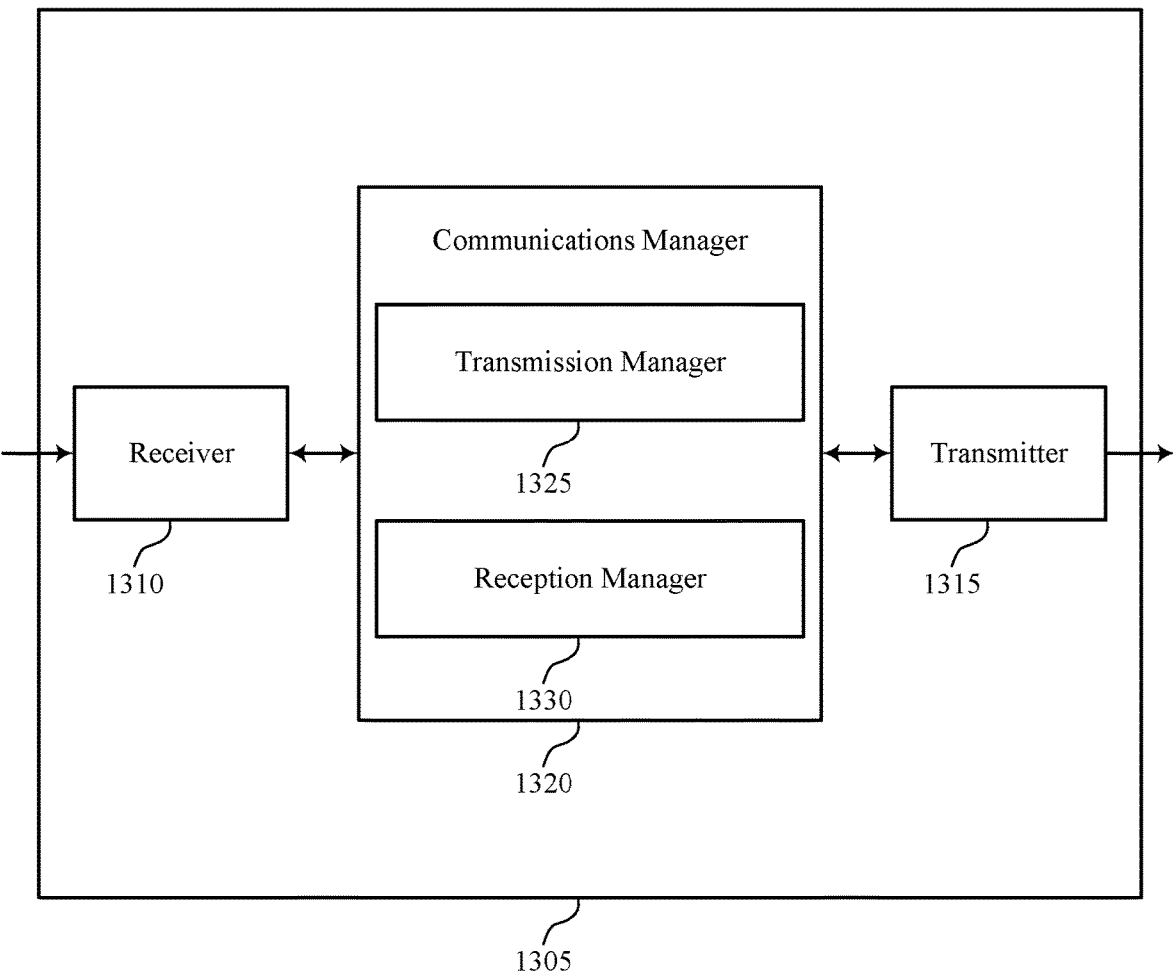

FIG. 13 shows a block diagram 1300 of a device 1305 that supports techniques for communicating synchronization signals in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of techniques for communicating synchronization signals as described herein. For example, the communications manager 1320 may include a transmission manager 1325 a reception manager 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. The transmission manager 1325 may be configured as or otherwise support a means for transmitting a first synchronization signal to a UE during a symbol period using a first antenna port. The transmission manager 1325 may be configured as or otherwise support a means for transmitting a second synchronization signal to the UE during the symbol period using a second antenna port, where the second synchronization signal is spatially multiplexed with the first synchronization signal. The reception manager 1330 may be configured as or otherwise support a means for receiving, from the UE, a first message based on a parameter (e.g., cell identifier) indicated by the first synchronization signal and the second synchronization signal.

Figure 14:
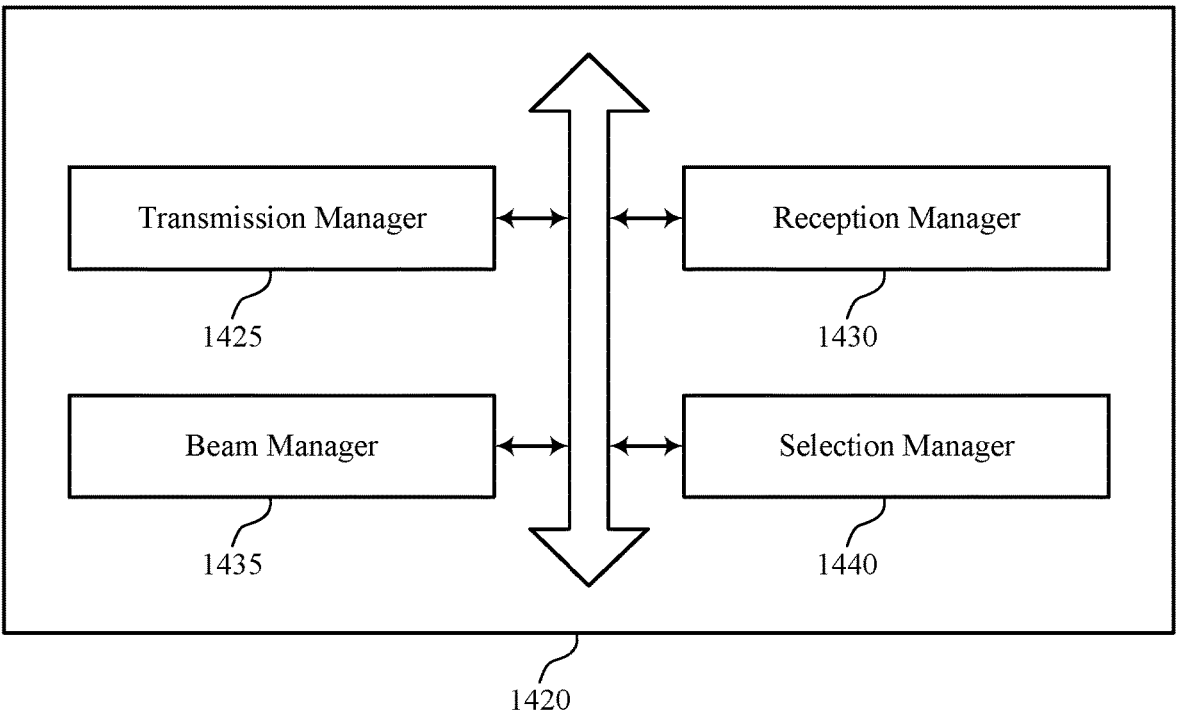
FIG. 14 shows a block diagram of a communications manager that supports techniques for communicating synchronization signals in accordance with one or more aspects of the present disclosure.

FIG. 14 shows a block diagram 1400 of a communications manager 1420 that supports techniques for communicating synchronization signals in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of techniques for communicating synchronization signals as described herein. For example, the communications manager 1420 may include a transmission manager 1425, a reception manager 1430, a beam manager 1435, a selection manager 1440, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication at a network entity in accordance with examples as disclosed herein. The transmission manager 1425 may be configured as or otherwise support a means for transmitting a first synchronization signal to a UE during a symbol period using a first antenna port. In some examples, the transmission manager 1425 may be configured as or otherwise support a means for transmitting a second synchronization signal to the UE during the symbol period using a second antenna port, where the second synchronization signal is spatially multiplexed with the first synchronization signal. The reception manager 1430 may be configured as or otherwise support a means for receiving, from the UE, a first message based on a parameter (e.g., cell identifier) indicated by the first synchronization signal and the second synchronization signal.

In some examples, the transmission manager 1425 may be configured as or otherwise support a means for transmitting the first synchronization signal during the symbol period using the first antenna port further includes transmitting the first synchronization signal using a first sequence. In some examples, the transmission manager 1425 may be configured as or otherwise support a means for transmitting the second synchronization signal during the symbol period using the second antenna port further includes transmitting the second synchronization signal using a second sequence.

In some examples, transmitting the first synchronization signal during the symbol period using the first antenna port further includes transmitting a first primary synchronization signal. In some examples, transmitting the second synchronization signal during the symbol period using the second antenna port further includes transmitting a second primary synchronization signal.

In some examples, transmitting the first synchronization signal during the symbol period using the first antenna port further includes transmitting a first secondary synchronization signal. In some examples, transmitting the second synchronization signal during the symbol period using the second antenna port further includes transmitting a second secondary synchronization signal.

In some examples, transmitting the first synchronization signal during the symbol period using the first antenna port further includes transmitting a primary synchronization signal. In some examples, transmitting the second synchronization signal during the symbol period using the second antenna port further includes transmitting a secondary synchronization signal.

In some examples, the transmission manager 1425 may be configured as or otherwise support a means for transmitting a third synchronization signal to the UE during the symbol period using a third antenna port. In some examples, the transmission manager 1425 may be configured as or otherwise support a means for transmitting a fourth synchronization signal to the UE during the symbol period using a fourth antenna port.

In some examples, the first synchronization signal is a first primary synchronization signal, the second synchronization signal is a second primary synchronization signal, the third synchronization signal is a first secondary synchronization signal, and the fourth synchronization signal is a second secondary synchronization signal. In some examples, the first synchronization signal, the second synchronization signal, the third synchronization signal, and the fourth synchronization signal are spatially multiplexed.

In some examples, the beam manager 1435 may be configured as or otherwise support a means for receiving, from the UE, a random access message using a first random access occasion of a set of multiple different random access occasions, the first random access occasion associated with a first beam.

In some examples, the selection manager 1440 may be configured as or otherwise support a means for selecting the first beam for subsequent communications with the UE based on receiving, from the UE, the random access message using the first random access occasion.

In some examples, each antenna port is associated with one or more antennas.

In some examples, the symbol period includes an orthogonal frequency-division multiplexing symbol period.

Figure 15:
FIG. 15 shows a diagram of a system including a device that supports techniques for communicating synchronization signals in accordance with one or more aspects of the present disclosure.

FIG. 15 shows a diagram of a system 1500 including a device 1505 that supports techniques for communicating synchronization signals in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting techniques for communicating synchronization signals). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links).

For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a network entity in accordance with examples as disclosed herein. For example, the communications manager 1520 may be configured as or otherwise support a means for transmitting a first synchronization signal to a UE during a symbol period using a first antenna port. The communications manager 1520 may be configured as or otherwise support a means for transmitting a second synchronization signal to the UE during the symbol period using a second antenna port, where the second synchronization signal is spatially multiplexed with the first synchronization signal. The communications manager 1520 may be configured as or otherwise support a means for receiving, from the UE, a first message based on a parameter (e.g., cell identifier) indicated by the first synchronization signal and the second synchronization signal.

By including or configuring the communications manager 1520 in accordance with examples as described herein, the device 1505 may support techniques for more effectively communicating synchronization signals. For example, the device 1505 may support techniques for spatial multiplexing of synchronization signals, which may improve throughput. Additionally, or alternatively, the device 1505 may support techniques for beam management associated with synchronization signaling. For example, the device 1505 may select one or more beams for communications based on determining that synchronization signals are spatially multiplexed. In some cases, communicating spatially multiplexed synchronization signals may improve utilization of communication resources and may improve coordination between devices.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of techniques for communicating synchronization signals as described herein, or the processor 1535 and the memory 1525 may be otherwise configured to perform or support such operations.

FIG. 16 shows a flowchart illustrating a method 1600 that supports techniques for communicating synchronization signals in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include monitoring, during a symbol period, a set of multiple frequency resources for a set of spatially multiplexed synchronization signals, the set of spatially multiplexed synchronization signals associated with a set of multiple antenna ports. The operations of 1605 may be performed in accordance with examples as disclosed herein. In some examples, aspects of the operations of 1605 may be performed by a monitoring component 1025 as described with reference to FIG. 10.

At 1610, the method may include receiving, during the symbol period, the set of spatially multiplexed synchronization signals, where the set of spatially multiplexed synchronization signals indicates a parameter (e.g., cell identifier) for a network entity. The operations of 1610 may be performed in accordance with examples as disclosed herein. In some examples, aspects of the operations of 1610 may be performed by a receiving component 1030 as described with reference to FIG. 10.

At 1615, the method may include transmitting, to a network entity, a first message based on the parameter (e.g., cell identifier). The operations of 1615 may be performed in accordance with examples as disclosed herein. In some examples, aspects of the operations of 1615 may be performed by a transmitting component 1035 as described with reference to FIG. 10.

FIG. 17 shows a flowchart illustrating a method 1700 that supports techniques for communicating synchronization signals in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include monitoring, during a symbol period, a set of multiple frequency resources for a set of spatially multiplexed synchronization signals, the set of spatially multiplexed synchronization signals associated with a set of multiple antenna ports. The operations of 1705 may be performed in accordance with examples as disclosed herein. In some examples, aspects of the operations of 1705 may be performed by a monitoring component 1025 as described with reference to FIG. 10.

At 1710, the method may include receiving, during the symbol period, the set of spatially multiplexed synchronization signals, where the set of spatially multiplexed synchronization signals indicates a parameter (e.g., cell identifier) for a network entity. The operations of 1710 may be performed in accordance with examples as disclosed herein. In some examples, aspects of the operations of 1710 may be performed by a receiving component 1030 as described with reference to FIG. 10.

At 1715, the method may include receiving, during the symbol period, a first synchronization signal of the set of spatially multiplexed synchronization signals, the first synchronization signal associated with a first sequence and a first antenna port of the set of multiple antenna ports. The operations of 1715 may be performed in accordance with examples as disclosed herein. In some examples, aspects of the operations of 1715 may be performed by a receiving component 1030 as described with reference to FIG. 10.

At 1720, the method may include receiving, during the symbol period, a second synchronization signal of the set of spatially multiplexed synchronization signals, the second synchronization signal associated with a second sequence different from the first sequence and a second antenna port of the set of multiple antenna ports. The operations of 1720 may be performed in accordance with examples as disclosed herein. In some examples, aspects of the operations of 1720 may be performed by a receiving component 1030 as described with reference to FIG. 10.

At 1725, the method may include transmitting, to a network entity, a first message based on the parameter (e.g., cell identifier). The operations of 1725 may be performed in accordance with examples as disclosed herein. In some examples, aspects of the operations of 1725 may be performed by a transmitting component 1035 as described with reference to FIG. 10.

FIG. 18 shows a flowchart illustrating a method 1800 that supports techniques for communicating synchronization signals in accordance with one or more aspects of the present disclosure. The operations of the method 1800 may be implemented by a network entity or its components as described herein. For example, the operations of the method 1800 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a first synchronization signal to a UE during a symbol period using a first antenna port. The operations of 1805 may be performed in accordance with examples as disclosed herein. In some examples, aspects of the operations of 1805 may be performed by a transmission manager 1425 as described with reference to FIG. 14.

At 1810, the method may include transmitting a second synchronization signal to the UE during the symbol period using a second antenna port, where the second synchronization signal is spatially multiplexed with the first synchronization signal. The operations of 1810 may be performed in accordance with examples as disclosed herein. In some examples, aspects of the operations of 1810 may be performed by a transmission manager 1425 as described with reference to FIG. 14.

At 1815, the method may include receiving, from the UE, a first message based on a parameter (e.g., cell identifier) indicated by the first synchronization signal and the second synchronization signal. The operations of 1815 may be performed in accordance with examples as disclosed herein. In some examples, aspects of the operations of 1815 may be performed by a reception manager 1430 as described with reference to FIG. 14.

FIG. 19 shows a flowchart illustrating a method 1900 that supports techniques for communicating synchronization signals in accordance with one or more aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include transmitting the first synchronization signal during the symbol period using the first antenna port further includes transmitting a first primary synchronization signal. The operations of 1905 may be performed in accordance with examples as disclosed herein. In some examples, aspects of the operations of 1905 may be performed by a transmission manager 1425 as described with reference to FIG. 14.

At 1910, the method may include transmitting the second synchronization signal during the symbol period using the second antenna port further includes transmitting a second primary synchronization signal. The operations of 1910 may be performed in accordance with examples as disclosed herein. In some examples, aspects of the operations of 1910 may be performed by a transmission manager 1425 as described with reference to FIG. 14.

At 1915, the method may include transmitting a first synchronization signal to a UE during a symbol period using a first antenna port. The operations of 1915 may be performed in accordance with examples as disclosed herein. In some examples, aspects of the operations of 1915 may be performed by a transmission manager 1425 as described with reference to FIG. 14.

At 1920, the method may include transmitting a second synchronization signal to the UE during the symbol period using a second antenna port, where the second synchronization signal is spatially multiplexed with the first synchronization signal. The operations of 1920 may be performed in accordance with examples as disclosed herein. In some examples, aspects of the operations of 1920 may be performed by a transmission manager 1425 as described with reference to FIG. 14.

At 1925, the method may include receiving, from the UE, a first message based on a parameter (e.g., cell identifier) indicated by the first synchronization signal and the second synchronization signal. The operations of 1925 may be performed in accordance with examples as disclosed herein. In some examples, aspects of the operations of 1925 may be performed by a reception manager 1430 as described with reference to FIG. 14.

The following provides an overview of aspects of the present disclosure:

Aspect 1: A method for wireless communication at a UE, comprising: monitoring, during a symbol period, a plurality of frequency resources for a set of spatially multiplexed synchronization signals, the set of spatially multiplexed synchronization signals associated with a plurality of antenna ports; receiving, during the symbol period, the set of spatially multiplexed synchronization signals, wherein the set of spatially multiplexed synchronization signals indicates a parameter; and transmitting, to a network entity, a first message based at least in part on the parameter.

Aspect 2: The method of aspect 1, wherein receiving the set of spatially multiplexed synchronization signals further comprises: receiving, during the symbol period, a first synchronization signal of the set of spatially multiplexed synchronization signals, the first synchronization signal associated with a first sequence and a first antenna port of the plurality of antenna ports; and receiving, during the symbol period, a second synchronization signal of the set of spatially multiplexed synchronization signals, the second synchronization signal associated with a second sequence different from the first sequence and a second antenna port of the plurality of antenna ports.

Aspect 3: The method of any of aspects 1 through 2, wherein receiving the set of spatially multiplexed synchronization signals further comprises: receiving, during the symbol period, a first synchronization signal spatially multiplexed with a second synchronization signal, the first synchronization signal comprising a first primary synchronization signal associated with a first antenna port of the plurality of antenna ports and the second synchronization signal comprising a second primary synchronization signal associated with a second antenna port of the plurality of antenna ports.

Aspect 4: The method of any of aspects 1 through 2, wherein receiving the set of spatially multiplexed synchronization signals further comprises: receiving, during the symbol period, a first synchronization signal spatially multiplexed with a second synchronization signal, the first synchronization signal comprising a first secondary synchronization signal associated with a first antenna port of the plurality of antenna ports and the second synchronization signal comprising a second secondary synchronization signal associated with a second antenna port of the plurality of antenna ports.

Aspect 5: The method of any of aspects 1 through 2, wherein receiving the set of spatially multiplexed synchronization signals further comprises: receiving, during the symbol period, a first synchronization signal spatially multiplexed with a second synchronization signal, the first synchronization signal comprising a primary synchronization signal associated with a first antenna port of the plurality of antenna ports and the second synchronization signal comprising a secondary synchronization signal associated with a second antenna port of the plurality of antenna ports.

Aspect 6: The method of any of aspects 1 through 2, wherein receiving the set of spatially multiplexed synchronization signals further comprises: receiving, during the symbol period, a first primary synchronization signal associated with a first antenna port of the plurality of antenna ports, a second primary synchronization signal associated with a second antenna port of the plurality of antenna ports, a first secondary synchronization signal associated with a third antenna port of the plurality of antenna ports, and a second secondary synchronization signal associated with a fourth antenna port of the plurality of antenna ports.

Aspect 7: The method of any of aspects 1 through 6, further comprising: measuring a first synchronization signal of the set of spatially multiplexed synchronization signals via first antenna port of the plurality of antenna ports and a second synchronization signal of the set of spatially multiplexed synchronization signals via a second antenna port of the plurality of antenna ports.

Aspect 8: The method of aspect 7, further comprising: selecting a first beam from a plurality of beams based at least in part on measuring the first synchronization signal via the first antenna port and measuring the second synchronization signal via the second antenna port; and transmitting, to the network entity, a random access message using a first random access occasion of a plurality of different random access occasions, the first random access occasion associated with the first beam.

Aspect 9: The method of any of aspects 1 through 8, wherein each antenna port is associated with one or more antennas.

Aspect 10: The method of any of aspects 1 through 9, wherein the symbol period comprises an orthogonal frequency-division multiplexing symbol period.

Aspect 11: The method of any of aspects 1 through 10, wherein the parameter comprises a cell identifier for the network entity.

Aspect 12: A method for wireless communication at a network entity, comprising: transmitting a first synchronization signal to a UE during a symbol period using a first antenna port; transmitting a second synchronization signal to the UE during the symbol period using a second antenna port, wherein the second synchronization signal is spatially multiplexed with the first synchronization signal; and receiving, from the UE, a first message based at least in part on a parameter indicated by the first synchronization signal and the second synchronization signal.

Aspect 13: The method of aspect 12, further comprising: transmitting the first synchronization signal during the symbol period using the first antenna port further comprises transmitting the first synchronization signal using a first sequence; and transmitting the second synchronization signal during the symbol period using the second antenna port further comprises transmitting the second synchronization signal using a second sequence.

Aspect 14: The method of any of aspects 12 through 13, wherein transmitting the first synchronization signal during the symbol period using the first antenna port further comprises transmitting a first primary synchronization signal; and transmitting the second synchronization signal during the symbol period using the second antenna port further comprises transmitting a second primary synchronization signal.

Aspect 15: The method of any of aspects 12 through 13, wherein transmitting the first synchronization signal during the symbol period using the first antenna port further comprises transmitting a first secondary synchronization signal; and transmitting the second synchronization signal during the symbol period using the second antenna port further comprises transmitting a second secondary synchronization signal.

Aspect 16: The method of any of aspects 12 through 13, wherein transmitting the first synchronization signal during the symbol period using the first antenna port further comprises transmitting a primary synchronization signal; and transmitting the second synchronization signal during the symbol period using the second antenna port further comprises transmitting a secondary synchronization signal.

Aspect 17: The method of any of aspects 12 through 13, further comprising: transmitting a third synchronization signal to the UE during the symbol period using a third antenna port; and transmitting a fourth synchronization signal to the UE during the symbol period using a fourth antenna port.

Aspect 18: The method of aspect 17, wherein the first synchronization signal is a first primary synchronization signal, the second synchronization signal is a second primary synchronization signal, the third synchronization signal is a first secondary synchronization signal, and the fourth synchronization signal is a second secondary synchronization signal, and the first synchronization signal, the second synchronization signal, the third synchronization signal, and the fourth synchronization signal are spatially multiplexed.

Aspect 19: The method of any of aspects 12 through 18, further comprising: receiving, from the UE, a random access message using a first random access occasion of a plurality of different random access occasions, the first random access occasion associated with a first beam.

Aspect 20: The method of aspect 19, further comprising: selecting the first beam for subsequent communications with the UE based at least in part on receiving, from the UE, the random access message using the first random access occasion.

Aspect 21: The method of any of aspects 12 through 20, wherein each antenna port is associated with one or more antennas.

Aspect 22: The method of any of aspects 12 through 21, wherein the symbol period comprises an orthogonal frequency-division multiplexing symbol period.

Aspect 23: The method of any of aspects 12 through 22, wherein the parameter comprises a cell identifier for the network entity.

Aspect 24: An apparatus for wireless communication at a UE, comprising a processor; memory coupled with the processor; and instructions stored in the memory and executable by the processor to cause the apparatus to perform a method of any of aspects 1 through 11.

Aspect 25: An apparatus for wireless communication at a UE, comprising at least one means for performing a method of any of aspects 1 through 11.

Aspect 26: A non-transitory computer-readable medium storing code for wireless communication at a UE, the code comprising instructions executable by a processor to perform a method of any of aspects 1 through 11.

Aspect 27: An apparatus for wireless communication at a network entity, comprising a processor; memory coupled with the processor; and instructions stored in the memory and executable by the processor to cause the apparatus to perform a method of any of aspects 12 through 23.

Aspect 28: An apparatus for wireless communication at a network entity, comprising at least one means for performing a method of any of aspects 12 through 23.

Aspect 29: A non-transitory computer-readable medium storing code for wireless communication at a network entity, the code comprising instructions executable by a processor to perform a method of any of aspects 12 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:

a processor;

memory coupled with the processor; and instructions stored in the memory and executable by the processor to cause the apparatus to:

monitor, during a symbol period, a plurality of frequency resources for a set of spatially multiplexed synchronization signals, the set of spatially multiplexed synchronization signals associated with a plurality of antenna ports;

receive, during the symbol period, the set of spatially multiplexed synchronization signals, wherein the set of spatially multiplexed synchronization signals indicates a parameter, wherein the set of spatially multiplexed synchronization signals comprises (1) a synchronization signal associated with a first sequence and a first antenna port of the plurality of antenna ports and a synchronization signal associated with a second sequence different from the first sequence and a second antenna port of the plurality of antenna ports, the second synchronization signal associated with a second sequence different from the first sequence and a second antenna port of the plurality of antenna ports, or (2) a first synchronization signal spatially multiplexed with a second synchronization signal; and transmit, to a network entity, a first message based at least in part on the parameter.

2. The apparatus of claim 1, wherein
the spatially multiplexed first synchronization signal comprising a first primary synchronization signal associated with a first antenna port of the plurality of antenna ports and the second synchronization signal comprising a second primary synchronization signal associated with a second antenna port of the plurality of antenna ports.

3. The apparatus of claim 1,
the spatially multiplexed first synchronization signal comprising a first secondary synchronization signal associated with a first antenna port of the plurality of antenna ports and the second synchronization signal comprising a second secondary synchronization signal associated with a second antenna port of the plurality of antenna ports.

4. The apparatus of claim 1,
the spatially multiplexed first synchronization signal comprising a primary synchronization signal associated with a first antenna port of the plurality of antenna ports and the second synchronization signal comprising a secondary synchronization signal associated with a second antenna port of the plurality of antenna ports.

5. The apparatus of claim 1, wherein the instructions to receive the set of spatially multiplexed synchronization signals are further executable by the processor to cause the apparatus to:
receive, during the symbol period, a first primary synchronization signal associated with a first antenna port of the plurality of antenna ports, a second primary synchronization signal associated with a second antenna port of the plurality of antenna ports, a first secondary synchronization signal associated with a third antenna port of the plurality of antenna ports, and a second secondary synchronization signal associated with a fourth antenna port of the plurality of antenna ports.

6. The apparatus of claim 1, wherein the instructions are further executable by the processor to cause the apparatus to:
measure a first synchronization signal of the set of spatially multiplexed synchronization signals via first antenna port of the plurality of antenna ports and a second synchronization signal of the set of spatially multiplexed synchronization signals via a second antenna port of the plurality of antenna ports.

7. The apparatus of claim 6, wherein the instructions are further executable by the processor to cause the apparatus to:
select a first beam from a plurality of beams based at least in part on measuring the first synchronization signal via the first antenna port and measuring the second synchronization signal via the second antenna port; and transmit, to the network entity, a random access message using a first random access occasion of a plurality of different random access occasions, the first random access occasion associated with the first beam.

8. The apparatus of claim 1, wherein:
each antenna port is associated with one or more antennas.

9. The apparatus of claim 1, wherein the symbol period comprises an orthogonal frequency-division multiplexing symbol period.

10. The apparatus of claim 1, wherein the parameter comprises a cell identifier for the network entity.

11. An apparatus for wireless communication at a network entity, comprising:
a processor;
memory coupled with the processor; and
instructions stored in the memory and executable by the processor to cause the apparatus to:
transmit a first synchronization signal to a user equipment (UE) during a symbol period using a first antenna port;
transmit a second synchronization signal to the UE during the symbol period using a second antenna port, wherein the second synchronization signal is spatially multiplexed with the first synchronization signal;
transmit a third synchronization signal to the UE during the symbol period using a third antenna port; and
transmit a fourth synchronization signal to the UE during the symbol period using a fourth antenna port; and
receive, from the UE, a first message based at least in part on a parameter indicated by the first synchronization signal and the second synchronization signal;
wherein the first synchronization signal is a first primary synchronization signal, the second synchronization signal is a second primary synchronization signal, the third synchronization signal is a first secondary synchronization signal, and the fourth synchronization signal is a second secondary synchronization signal, and the first synchronization signal, the second synchronization signal, the third synchronization signal, and the fourth synchronization signal are spatially multiplexed.

12. The apparatus of claim 11, wherein the instructions are further executable by the processor to cause the apparatus to:
transmit the first synchronization signal during the symbol period using the first antenna port further comprises transmitting the first synchronization signal using a first sequence; and
transmit the second synchronization signal during the symbol period using the second antenna port further comprises transmitting the second synchronization signal using a second sequence.

13. The apparatus of claim 11, wherein:
transmitting the first synchronization signal during the symbol period using the first antenna port further comprises transmitting a first primary synchronization signal; and
transmitting the second synchronization signal during the symbol period using the second antenna port further comprises transmitting a second primary synchronization signal.

14. The apparatus of claim 11, wherein:
transmitting the first synchronization signal during the symbol period using the first antenna port further comprises transmitting a first secondary synchronization signal; and transmitting the second synchronization signal during the symbol period using the second antenna port further comprises transmitting a second secondary synchronization signal.

15. The apparatus of claim 11, wherein:

transmitting the first synchronization signal during the symbol period using the first antenna port further comprises transmitting a primary synchronization signal; and transmitting the second synchronization signal during the symbol period using the second antenna port further comprises transmitting a secondary synchronization signal.

16. The apparatus of claim 11, wherein the instructions are further executable by the processor to cause the apparatus to:

receive, from the UE, a random access message using a first random access occasion of a plurality of different random access occasions, the first random access occasion associated with a first beam.

17. The apparatus of claim 16, wherein the instructions are further executable by the processor to cause the apparatus to:

select the first beam for subsequent communications with the UE based at least in part on receiving, from the UE, the random access message using the first random access occasion.

18. The apparatus of claim 11, wherein:

each antenna port is associated with one or more antennas.

19. The apparatus of claim 11, wherein the symbol period comprises an orthogonal frequency-division multiplexing symbol period.

20. The apparatus of claim 11, wherein the parameter comprises a cell identifier for the network entity.

21. A method for wireless communication at a user equipment (UE), comprising:

monitoring, during a symbol period, a plurality of frequency resources for a set of spatially multiplexed synchronization signals, the set of spatially multiplexed synchronization signals associated with a plurality of antenna ports;

receiving, during the symbol period, the set of spatially multiplexed synchronization signals, wherein the set of spatially multiplexed synchronization signals indicates a parameter, wherein the set of spatially multiplexed synchronization signals comprises (1) a synchronization signal associated with a first sequence and a first antenna port of the plurality of antenna ports and a synchronization signal associated with a second sequence different from the first sequence and a second antenna port of the plurality of antenna ports, the second synchronization signal associated with a second sequence different from the first sequence and a second antenna port of the plurality of antenna ports, or (2) a first synchronization signal spatially multiplexed with a second synchronization signal; and transmitting, to a network entity, a first message based at least in part on the parameter.

22. The method of claim 21, the spatially multiplexed first synchronization signal comprising a first primary synchronization signal associated with a first antenna port of the plurality of antenna ports and the second synchronization signal comprising a second primary synchronization signal associated with a second antenna port of the plurality of antenna ports.

23. The method of claim 21, the spatially multiplexed first synchronization signal comprising a first secondary synchronization signal associated with a first antenna port of the plurality of antenna ports and the second synchronization signal comprising a second secondary synchronization signal associated with a second antenna port of the plurality of antenna ports.

24. The method of claim 21, the spatially multiplexed first synchronization signal comprising a primary synchronization signal associated with a first antenna port of the plurality of antenna ports and the second synchronization signal comprising a secondary synchronization signal associated with a second antenna port of the plurality of antenna ports.

25. The method of claim 21, wherein receiving the set of spatially multiplexed synchronization signals further comprises:

receiving, during the symbol period, a first primary synchronization signal associated with a first antenna port of the plurality of antenna ports, a second primary synchronization signal associated with a second antenna port of the plurality of antenna ports, a first secondary synchronization signal associated with a third antenna port of the plurality of antenna ports, and a second secondary synchronization signal associated with a fourth antenna port of the plurality of antenna ports.

* * * * *